United States Patent
Tofighi et al.

(10) Patent No.: US 12,484,798 B2
(45) Date of Patent: Dec. 2, 2025

(54) ASSESSMENT OF SKIN PERFUSION USING MICROWAVE HEATING AND USING INFRARED RADIOMETRY

(71) Applicant: The Penn State Research Foundation, University Park, PA (US)

(72) Inventors: Mohammad-Reza Tofighi, Malvern, PA (US); Anilchandra Attaluri, Middletown, PA (US); Dino Ravnic, Hershey, PA (US)

(73) Assignee: The Penn State Research Foundation, University Park, PA (US)

( * ) Notice: Subject to any disclaimer, the term of this patent is extended or adjusted under 35 U.S.C. 154(b) by 1022 days.

(21) Appl. No.: 17/437,957

(22) PCT Filed: May 26, 2020

(86) PCT No.: PCT/US2020/034563
§ 371 (c)(1),
(2) Date: Sep. 10, 2021

(87) PCT Pub. No.: WO2020/247208
PCT Pub. Date: Dec. 10, 2020

(65) Prior Publication Data
US 2022/0167865 A1   Jun. 2, 2022

Related U.S. Application Data

(60) Provisional application No. 62/856,289, filed on Jun. 3, 2019.

(51) Int. Cl.
*A61B 5/0507*   (2021.01)
*A61B 5/00*   (2006.01)
*A61B 5/026*   (2006.01)

(52) U.S. Cl.
CPC .......... *A61B 5/0507* (2013.01); *A61B 5/0075* (2013.01); *A61B 5/0261* (2013.01)

(58) Field of Classification Search
CPC ... A61B 5/0507; A61B 5/0075; A61B 5/0261; H01Q 1/273
(Continued)

(56) References Cited

U.S. PATENT DOCUMENTS

| | | | |
|---|---|---|---|
| 7,267,651 B2 * | 9/2007 | Nelson | A61B 5/026 600/549 |
| 8,447,385 B2 * | 5/2013 | Sterzer | A61B 5/01 600/549 |
| 9,250,139 B2 | 2/2016 | Tofighi | |

FOREIGN PATENT DOCUMENTS

WO   2012015539 A2   2/2012

OTHER PUBLICATIONS

International Search Report for PCT/US2020/034563 dated Jul. 20, 2020.
(Continued)

*Primary Examiner* — Jacqueline Cheng
*Assistant Examiner* — Chanel J Jhin
(74) *Attorney, Agent, or Firm* — Buchanan Ingersoll & Rooney PC

(57) ABSTRACT

Embodiments relate to use of microwave heating and infrared thermography for assessing perfusion. The system includes a microwave source, an antenna, and a radiometer. The microwave source generates microwave radiation at a frequency that is tuned to or near a resonance frequency by the antenna to output a microwave beam. The microwave beam is caused to be incident upon tissue and is converted to heat. The heated tissue emits infrared radiation that is monitored by the radiometer. The system allows for a low-cost, efficient, and non-invasive technique to assess blood perfusion without radiofrequency interference. Use of
(Continued)

infrared thermography is accomplished by the formation of the hole in the antenna structure. Use of an array of such antennas allows the measurement of perfusion for multiple points across a region of the body. The efficiency of the system is aided by adjusting the average microwave power via pulse width modulation.

15 Claims, 30 Drawing Sheets

(58) Field of Classification Search
USPC .......................................................... 600/504
See application file for complete search history.

(56) References Cited

OTHER PUBLICATIONS

Written Opinion of the International Searching Authority for PCT/US2020/034563 dated Jul. 20, 2020.

"QFlow 500™ Perfusion Probe—theory of operation", available: http://hemedex.com/clinical/theory-of-operation/.

"Annular Slot Biomedical Antenna for Combined Microwave Heating and Infrared Thermography of the Tissue" by Mohammad-Reza Tofighi and Anilchandra Attaluri; 2019 Radio and Wireless Symposium (RWS); 2019 IEEE.

A. K. Jayanthy, N. Sujatha, and M. Ramasubba Reddy, "Measuring blood flow: techniques and applications-a review," Int J Res Review Appl Sci. vol. 6, No. 2, pp. 203-216, 2011.

M. R. Tofighi and J. Pardeshi, "Interference Enhanced Biomedical Antenna for Combined Heating and Radiometry Application," IEEE Antenna and Wireless Propagation Letters, vol. 16, pp. 1895-1898, 2017.

E. P. Scott, P. S. Robinson, and T. E. Diller, "Development of methodologies for the estimation of blood perfusion using a minimally invasive thermal probe," Meas. Sci. Technol., vol. 9, pp. 888-897, 1998.

* cited by examiner (a)         (b)

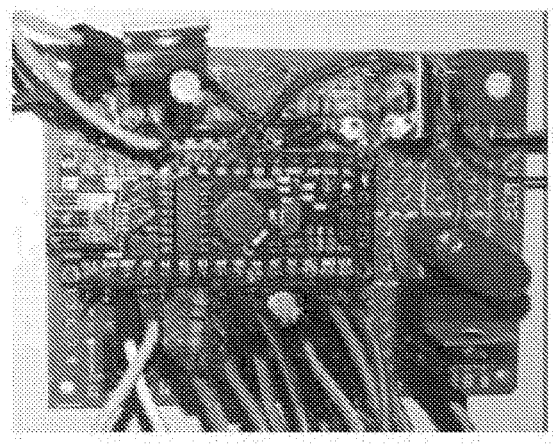 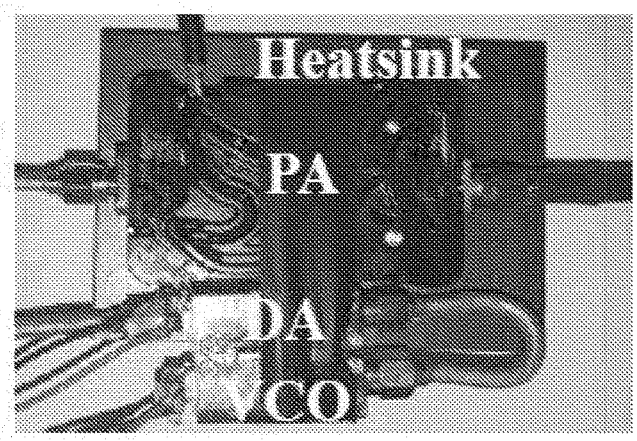
FIG. 29A                    FIG. 29B

ASSESSMENT OF SKIN PERFUSION USING MICROWAVE HEATING AND USING INFRARED RADIOMETRY

CROSS-REFERENCE TO RELATED APPLICATIONS

This application is the U.S. national stage application of International Patent Application No. PCT/US2020/034563, filed on May 26, 2020, which is related to and claims the benefit of U.S. Provisional Application No. 62/856,289, filed Jun. 3, 2019, the entire contents of which is incorporated herein by reference.

FIELD OF THE INVENTION

Embodiments relate to systems and methods for using microwave heating and infrared thermography for assessing deep tissue and/or skin perfusion.

BACKGROUND OF THE INVENTION

Deep tissue and skin perfusion (e.g., measurement of blood flow in deep tissue and skin) is a critical factor in the management of many medical conditions (e.g., peripheral vascular disease) and medical procedures (e.g., plastic surgery using skin flaps). Conventional perfusion measurement techniques tend to have limited clinical use due to a lack of reliable and cost-effective devices capable of measuring the absolute blood perfusion rate. For instance, known thermal diffusion methods either rely on conduction heating (e.g., heat is created outside and penetrates into the tissue) or are invasive (e.g., heater is embedded in the tissue). Some systems use volumetric heating (as opposed to conduction heating) and microwave radiometry (MWR) to measure the tissue temperature. While utilizing MWR can allow for measuring the temperature to a depth of few centimeters, its performance tends to highly degrade within the presence of radio frequency interferences (RFIs) from radio and wireless devices, thereby requiring more complex and more costly circuitry to mitigate RFIs.

Other conventional techniques include: 1) use of Magnetic Resonance Imaging (MRI) (this can facilitate perfusion across a large region, but it is very costly, time consuming, and laborious to set up; 2) Thermal Diffusion Probes (TDPs) (these are low cost, but invasive, requiring puncture in the tissue; 3) Laser Doppler flowmetry (LDF) (this is fast and provides high resolution, but it requires bulky and expensive laser equipment and it is based on a relative measurement of moving red blood cells, and thus is very sensitive to the orientation of the interrogating probe placed on the body; 4) Oximetry using near-infrared (NIR) or visible light that is cost-effective and easy to use, but unreliable as it measures blood oxygenation level rather than blood flow/perfusion; 5) Doppler Ultrasound, that is useful in assessing blood flow in large vessels, but its sensitivity is limited due to backscattering from bones and is not effective in measuring blood perfusion in microstructure of vessels; and 6) SPY Fluorescence Imaging Technology that requires ICG (Indocyanine green) dye injection each time that an assessment needs to be performed, which is not cost effective and convenient.

Conventional systems can be appreciated from U.S. Pat. No. 9,250,139; P. Scott, P. S. Robinson, and T. E. Diller, "Development of methodologies for the estimation of blood perfusion using a minimally invasive thermal probe," Meas. Sci. Technol., Vol. 9, pp. 888-897, 1998; "QFlow 500™ Perfusion Probe—theory of operation", available: http://hemedex.com/clinical/theory-of-operation/; A. K. Jayanthy, N. Sujatha, and M. Ramasubba Reddy, "Measuring blood flow: techniques and applications—a review," *Int J Res Review Appl Sci*. Vol. 6, No. 2, pp. 203-216, 2011; and M. R. Tofighi and J. Pardeshi, "Interference Enhanced Biomedical Antenna for Combined Heating and Radiometry Application," IEEE Antenna and Wireless Propagation Letters, Vol. 16, pp. 1895-1898, 2017.

BRIEF SUMMARY OF THE INVENTION

Embodiments relate to systems and methods for using microwave heating and infrared thermography for assessing deep tissue and/or skin perfusion. Thus, the system combines the advantages of microwave heating and infrared thermography. The system includes a microwave source, an antenna (such as slot antenna), and a radiometer. The microwave source generates microwave signal that is tuned to a heating frequency and is radiated by the antenna to output a microwave beam inside the biological tissue or a medium with similar electrical properties. The microwave beam is caused to be incident upon tissue and is converted to heat at a heated region coinciding with a hole in the antenna structure. The heated tissue emits infrared radiation that is directed back through the hole to be monitored by the radiometer. The radiometer is an infrared thermometer or camera that can detect this infrared radiation. Embodiments of the system allow for a low-cost, non-invasive, means to assess blood perfusion that is not subject to radiofrequency interference. Use of infrared thermography is accomplished by the formation of the hole in the antenna structure. The structure of the antenna is laid out such that the antenna characteristics such as the generated beam is minimally affected by the inclusion of the hole that must exist to allow the infrared radiation to reach the radiometer.

Additional embodiments can include a multi-hole antenna array to facilitate blood perfusion assessment from multiple heated regions. Additional embodiments can also include a feedback temperature control to regulate microwave heating.

The antenna structure may comprise of a substrate or layers of substrate materials upon which proper shape and pattern of metallization is laid out to input the incoming microwave signal and generate the appropriate beam at the frequency of that signal. In an exemplary embodiment, an antenna includes a substrate having a substrate top layer and a substrate bottom layer; a metallization layer formed on the bottom surface of the top layer; a hole formed in the substrate extending from the top surface of the top layer to the bottom surface of the bottom layer; a de-metallized area formed around the hole; a slot enveloping the de-metallized area, and a signal feed line presented at the top surface of the top layer. In some embodiments, the feed line is a cable attached to the top layer and reaching to the metallized layer and the slot through a metal via.

In some embodiments, the substrate bottom layer is a "superstrate" disposed on the bottom surface of the top layer substrate, which is referred to the "substrate" in exemplary embodiments to follow.

In some embodiments, the superstrate covers the metallization layer and the de-metallized area.

In some embodiments, the hole extends through the superstrate.

In some embodiments, the hole is circular in shape.

In some embodiments, the de-metallized area is circular in shape.

In some embodiments, the hole may span across the entire de-metalized area rendering no remaining de-metalized area surrounding the hole.

In some embodiments, the slot is circular in shape, square in shape, or oval in shape.

In some embodiments, the hole comprises a plurality of holes arranged in an array; the de-metallized area comprises a plurality of de-metallized areas, each individual de-metallized area formed around each individual hole; and the slot comprises a plurality of slots, each individual slot enveloping each individual de-metallized area.

In some embodiments, the antenna includes a microstrip feed network formed against the metallization layer. In some embodiments the microstrip feed network is connected to at least two slots and configured to provide a power splitting function. In some embodiments each microstrip feed is connected to one slot without power splitting function. In some embodiments, the microstrip feed network can be replaced with other types of feed network, such as slotlines, coplanar strips, coplanar waveguides, other waveguides, etc., with antenna feed and power split capabilities. In some embodiments, the feed network is connected to an external microwave source. In some embodiments, a microwave source or a plurality of sources are embedded in the substrate layers.

In an exemplary embodiment, a blood perfusion assessment system includes a microwave source configured to generate microwave power; an antenna configured to receive the microwave power and create a microwave beam so that the microwave beam is incident upon tissue to generate a heat zone beneath the antenna; and a radiometer configured to receive the infrared radiation emitted from the tissue through a hole formed into the antenna.

In some embodiments, the blood perfusion assessment system includes a controller coupled to the microwave source and radiometer, wherein: the controller converts the infrared radiation received by the radiometer to temperature readings; and the controller is configured to adjust the microwave source for the amount of power and frequency of microwave power. In some embodiments, the amount of signal's power outputted by the microwave source is adjusted by the controller based on the temperature readings. In some embodiments, the microwave source includes at-least a signal source and a power amplifier to boost that signal's power. In some embodiments, the microwave source has multiple stages of amplifications. In some embodiments, the microwave source includes a variable attenuator or a variable gain amplifier to adjust the amount of power as determined by the controller. In some embodiments, the microwave source includes a switch or switching function to repeatedly turn on and off the microwave power reaching the antenna by the controller, thereby controlling the amount of average microwave power by the controller by means of switching the microwave source on and off. In these embodiments, the switching control signal by the controller have adjustable time width or is pulse-width modulated.

In some embodiments, the radiometer includes an infrared camera.

In some embodiments, the radiometer includes an infrared thermometer.

In some embodiments, the antenna includes a substrate having a substrate top layer and a substrate bottom layer; a metallization layer formed on the bottom surface of the top layer; a hole formed in the substrate extending from the top surface of the top layer to the bottom surface of the bottom layer; a de-metallized area formed around the hole; a slot enveloping the de-metalized area; and a signal feed line reaching to the top surface of the top layer.

In some embodiments the radiometer includes an infrared thermometer and the infrared thermometer is located within the hole.

In some embodiments, the radiometer is an infrared thermometer and the infrared thermometer is located above the hole.

In some embodiments, the hole comprises a plurality of holes arranged in an array; the de-metallized area comprises a plurality of de-metallized areas, each individual de-metallized area formed around each individual hole; and the slot comprises a plurality of slots, with each individual slot enveloping the each individual de-metallized area.

In some embodiments, the microwave source includes a plurality of microwave sources arranged in an array.

In some embodiments, the antenna includes a microstrip feed network formed via the metallization layer, the microstrip feed network connected to at least two slots and configured to provide a power splitting function.

In some embodiments, the microwave source is embedded in the substrate.

In an exemplary embodiment, a method for assessing blood perfusion involves microwave heating of tissue; receiving infrared radiation from the tissue; and measuring a decay in temperature exhibited by the tissue to estimate a blood perfusion rate. In some embodiments, the rise in temperature exhibited by the tissue is used to estimate a blood perfusion rate. In some embodiments, the temperature steady-state level reached by the tissue is used to estimate a blood perfusion rate.

In some embodiments, the response is any one or combination of: a temperature rise, a temperature decay, and a temperature's steady-state value.

In some embodiments, the microwave heating involves generating microwave signal from a microwave source and outputting the microwave signal to an antenna configured to emit a microwave beam underneath the antenna so that the microwave beam is incident upon the tissue; and the receiving infrared radiation involves receiving the infrared radiation by a radiometer receiving the radiation through a hole formed into the antenna.

In some embodiments, the antenna is a slot antenna. In some embodiments, the antenna is a microstrip antenna. In some embodiments, the antenna is a pattern of metallization laid out on a substrate or layers of substrates to create a microwave beam with certain shape and in a certain frequency of radiation. In some embodiments, the antenna is a metallic structure to create a microwave beam with certain shape and in a certain frequency of radiation. In all embodiments, a direct path between the radiometer and the tissue, passing through the antenna structure, allows the detection by the radiometer of infrared radiation emitted by the heated tissue. In some embodiments, this direct path is a hole made in the antenna structure.

Further features, aspects, objects, advantages, and possible applications of the present invention will become apparent from a study of the exemplary embodiments and examples described below, in combination with the Figures, and the appended claims.

BRIEF DESCRIPTION OF THE FIGURES

The above and other objects, aspects, features, advantages and possible applications of the present invention will be more apparent from the following more particular description thereof, presented in conjunction with the following drawings. It should be understood that like reference numbers used in the drawings may identify like components.

FIGS. 2A-B show an exemplary antenna 102 that can be used for infrared thermometry, wherein FIG. 2A is a top view and FIG. 2B is a side view.

FIGS. 13A-B show the schematic of the test setups for testing an embodiment of the antenna, wherein FIG. 13A is a basic setup for phantom without flow and FIG. 13B is a setup for a perfused phantom, with perfusion regulated by a tubing system, a flowmeter, and a temperature regulated bath.

FIGS. 29A-B are the photos of the controller circuitry and the microwave power source/power amplifier (VCO: voltage controlled oscillator, DA: driver amplifier, PA: power amplifier).

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1:
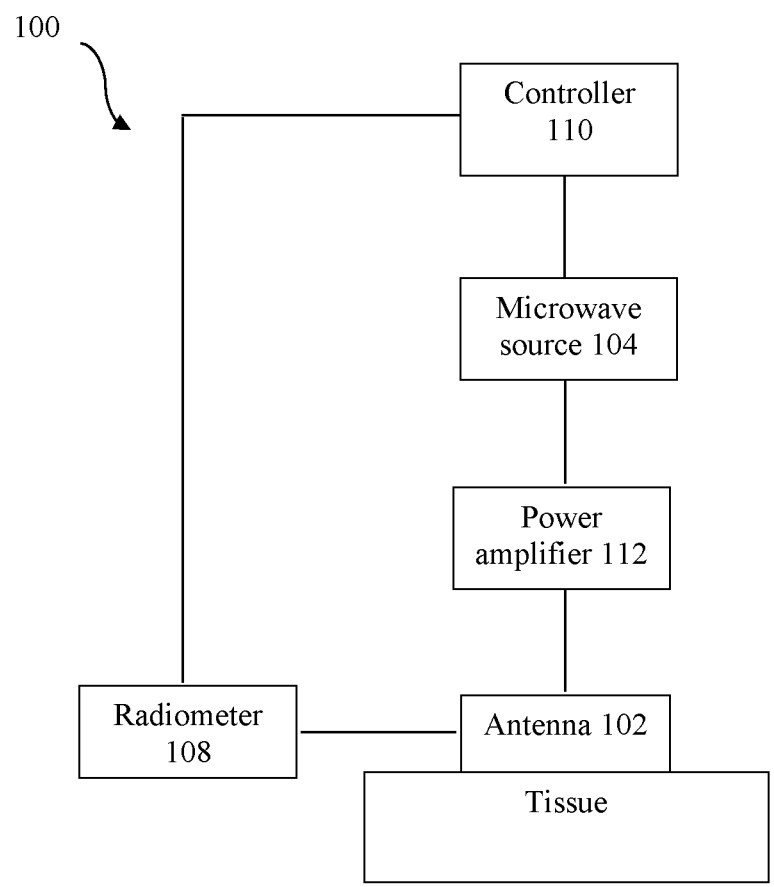
FIG. 1 shows a block diagram of an exemplary system configuration.

Referring to FIGS. 1-3, embodiments of the system 100 can include an antenna 102 and a microwave source 104. It is contemplated for the antenna 102 to be an annular slot antenna (ASA) 102. In operation, the antenna 102 is placed in contact with tissue of a person. As will be explained in detail later, the antenna 102 will cause the tissue to heat up and emit infrared radiation. The antenna can have a hole 106 formed within its structure. The emitted infrared radiation travels back through the hole 106 to be detected by a radiometer 108.

The microwave source 104 can be an electrical circuit, magnetron, etc. configured to generate an electrical waveform supplied to the antenna creating electromagnetic radiation with wavelengths ranging from about one meter to one centimeter (or frequencies between ~300 MHz and ~30 GHz). In an exemplary embodiment, the antenna 102 is coupled to the microwave source 104 through electrical connections. The system 100 can also have a controller 110 coupled to the microwave source 104. The controller 110 can be a processor with an associated memory and other electrical components that control the functioning of the microwave source and radiometer and monitor their operation. In some embodiments, the antenna 102 is coupled to a power amplifier 112 (e.g., a power amplifier circuit), wherein the power amplifier 112 is coupled to the microwave source 104. For instance, the antenna 102 can be coupled to the microwave source 104 via the power amplifier 112. The antenna 102 can also be coupled to the radiometer 108. The radiometer 108 can be configured to measuring the radiant flux (power) of electromagnetic radiation (blackbody radiation) emitted by the heated tissue. The controller 110 can be coupled to any one or combination of the microwave source 104, the radiometer 108, and/or the power amplifier 112.

The system architecture allows for the controller 110 to control the microwave source 104 and/or the power amplifier 112 to deliver microwave radiation to the tissue via the antenna 102. Different implementations can be used but in an exemplary embodiment, the controller 110 can cause the microwave source 104 to create microwave power. The microwave power can be received by the antenna 102 and is tuned to a resonant frequency and radiated at a microwave beam. In some embodiments, the controller 110 can then cause the microwave source 104 to discontinue the generation of microwave radiation after a predetermined amount of time (e.g., after a predetermined amount of time that is expected to raise the temperature of the tissue by a predetermined amount (e.g., 1° C.)). During the microwave irradiation session, the controller 110 can cause the radiometer 108 to measure the rate of increase of temperature in the tissue. This can be accomplished by the radiometer 108 detecting infrared radiation being emitted from the tissue. The measured rise of the temperature can then be used to obtain the blood perfusion rate. Alternatively, during the discontinued microwave irradiation session, the controller 110 can cause the radiometer 108 to measure the rate of decay of temperature in the tissue. This can be accomplished by the radiometer 108 detecting infrared radiation being emitted from the tissue. In some embodiments, the controller 110 can cause the microwave source 104 to discontinue the generation of microwave radiation after the temperature reaches to a steady-state level and no longer rises. The measured steady-state level of the temperature can then be used to obtain the blood perfusion rate.

Different strategies can be employed to estimate the perfusion from measurements performed by the system 100. In one approach, microwave radiation can be applied to the tissue via a power setting mechanism to reach a fixed target temperature, wherein the steady-state temperature elevation from the tissue baseline temperature can be recorded. Alternatively, the temperature rise or decay response can be also recorded by turning off the microwave source 104 either after a predetermined elapsed time or after the steady-state temperature elevation is reached. The perfusion then can be obtained by the temperature rise or decay waveform and/or its steady-state value. This can be done in a manner similar to the perfusion estimation from a convective perfusion probe technique used in Mudaliar et al., "A Phantom Tissue System for the Calibration of Perfusion Measurements. J Biomech Eng., 130(5), October 2008, the contents of which are herein incorporated by reference in their entirety. In this technique, a heat flux gage is used to measure the heat flux response of tissue when convective cooling is applied. The measured and calculated heat flux data are used to determine perfusion by minimizing an objective function containing both measured and experimental data. The calculated data are obtained from a finite-difference model based on the well-known Pennes bioheat equation. The calculation starts with an initial guess of the pertinent tissue parameters, which are iteratively updated until a desired convergence is reached. The algorithm for convective cooling method estimates both perfusion and thermal contact resistance. Microwave heating adds another aspect to such a parameter estimation method. Maxwell's equation needs to be solved to find specific absorption rate (SAR) that will be applied as the Source of heat generation in the following Pennes equation modified by incorporating microwave heating (SAR):

$$\nabla \cdot (k\nabla T) - (\rho C w)_b (T - T_a) + \rho_t SAR + q_m C_t \rho_t \frac{dT}{dt}$$

$\rho_t$ and $\rho_b$, are mass density of tissue and blood, $C_t$, and $C_b$, are specific heat of tissue and blood, T is the tissue temperature, $T_a$ is arterial temperature (usually 37° C.), k is the thermal conductivity of tissue, w is the blood perfusion rate, and SAR is the specific absorption rate (SAR=$\sigma E^2/\rho_t$, E: electric field intensity, $\sigma$: electric conductivity) from the microwave absorption in tissue. $\rho_t SAR$ represents the volumetric heat generation due to microwave absorption and is larger than q, the metabolic heat generation. Solution of the above equation should be performed numerically for accurate evaluation of heat transfer. Nonetheless, a crude estimate of the solution can also be obtained. Assuming a one-dimensional problem of a region of length L, whose temperature is elevated by a certain value, the heating/cooling exponential decay/rise occurs with a time constant in the order of roughly $L^2/\pi^2\alpha$, where $\alpha(=k/\rho C)$ is thermal diffusivity of the tissue. For L=2 cm, $\rho$=1060 kg/m, k=0.5 Wm° C., and C=3600 J/kg. C., this time constant is about 310 seconds. This is comparable to time constant associated for perfusion of about 330 seconds (1/w, w=0.003 mL/gr/s for skin).

Additional understanding of estimating the perfusion, antenna configurations, and system configurations can be appreciated from U.S. Pat. No. 9,250,139, which is incorporated herein by reference in its entirety.

Figures 2A, 2B:
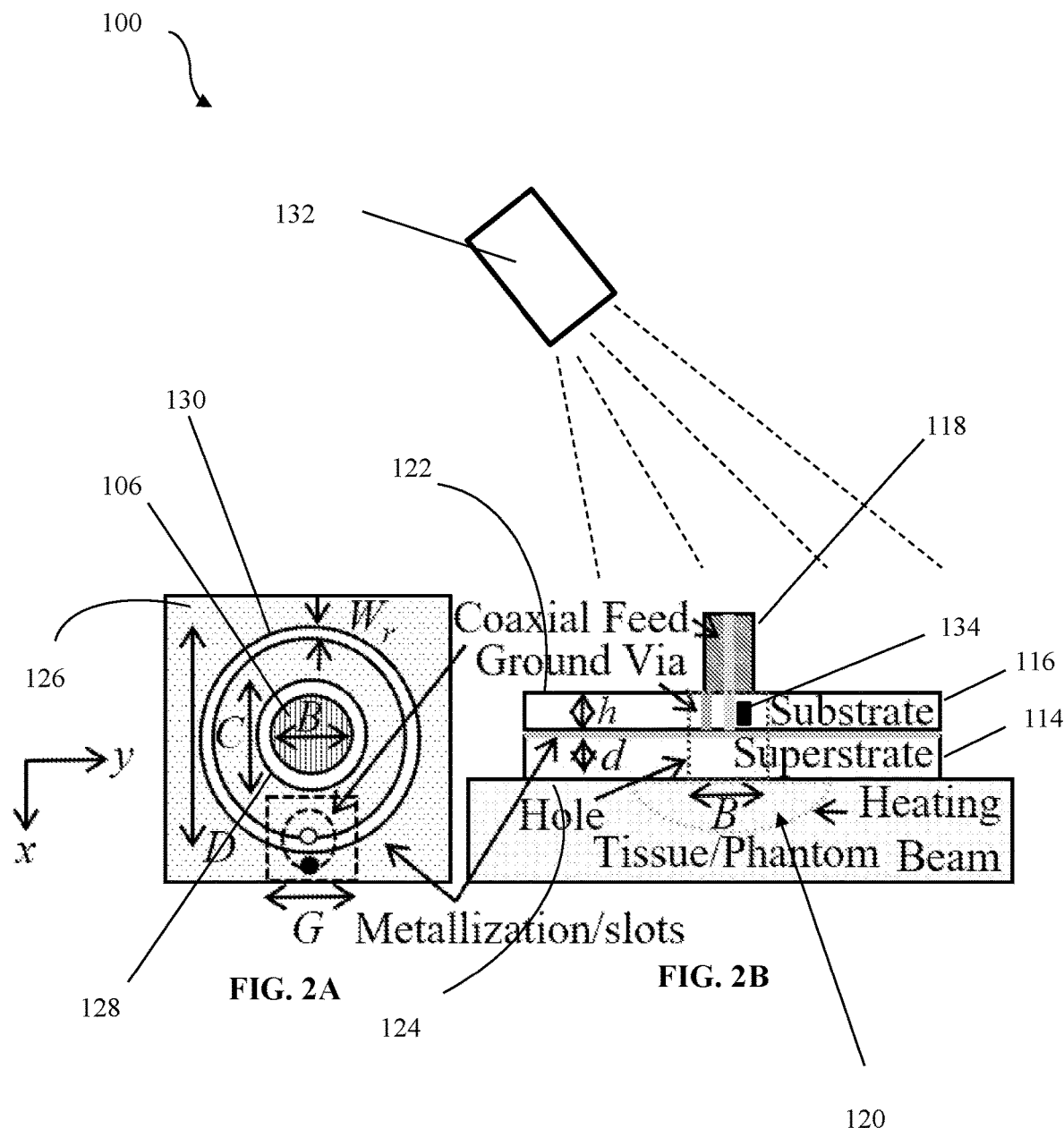

FIGS. 2A-B show an exemplary antenna 102 that can be used for infrared thermometry, wherein FIG. 2A is a top view and FIG. 2B is a side view. The antenna 102 includes a superstrate (e.g., silicon rubber) 114 and a substrate 116 (e.g., glass, silicon, FR4, etc.), wherein the superstrate 114 is disposed on a surface of the substrate 116. A bottom surface of the substrate 116 can include the location of the feed generated by metallization of the bottom surface. The superstrate 114 can be disposed on the bottom surface of the substrate 116. In use, the antenna 102 is placed against the tissue with the bottom surface 124 of the superstrate 114 being adjacent the tissue. The superstrate 114 can serve as an overlay coating to prevent direct contact of the antenna metallization with the tissue. A hole 106 can be formed in the substrate 116. The hole 106 can also be formed in the superstrate 114, if a superstrate 114 is used—i.e., the hole 106 passes through the substrate 116 and the superstrate 114. The hole 106 can have a diameter B. A coaxial feed 118, leading to the power amplifier 112, can be attached to a top surface of the substrate 116 and be reached to the feed at the bottom surface of the substrate through a via embedded in the substrate. The coaxial feed 118 can be coaxial with the hole 106.

During operation, the antenna 102 is placed against the tissue such that the superstrate 114 is adjacent to the tissue. The controller 110 causes the microwave source 104 to generate microwave radiation, which is transmitted through the power amplifier 112 and directed to the antenna 102. The antenna 102 radiates the microwave power that is created by the microwave source at a particular frequency to generate a microwave beam output. The microwave beam is caused to be incident upon tissue and is converted to heat at a heated region 120 coinciding with the hole 106 in the antenna 102—i.e., the zone at which the microwave radiation is incident upon the tissue is referred to herein as the heated region 120. The heated tissue emits infrared radiation, at least part of which is directed back through the hole 106, to be monitored by the radiometer 108.

The antenna 102 can have a substrate 116. The substrate 116 can have a top surface 122 and a bottom surface 126. The top surface 122 can be attached to the coaxial feed 118. The bottom surface 126 can have the superstrate 114 disposed thereon. The bottom surface underneath the substrate 116 can also be metalized. The bottom surface of the substrate 116 can involve a metallization layer 126. Removal techniques (e.g., etching) can be used to remove a portion of the metallization layer 126. For instance, a de-metalized area 128 can be formed within the metallization layer 126, with the de-metalized area 128 being devoid of metallization. The slot 130 can also be formed the same way. The de-metalized areas 128 and 130 can have a shape. For instance, the de-metalized area 128 can have a circular area with a diameter C. It is contemplated for the circular area 128 to surround the hole 106 of diameter B. For instance, the circular area 128 can be formed on the substrate 116 bottom surface 126 at the periphery of the hole 106—i.e., the circular area 128 can be in the shape of an annular ring that surrounds the periphery of the hole 106. The hole 106 may span around the middle of the substrate 116 such that it can render the de-metallization area 128 non-existent. The shape, size, thickness, diameter, etc. of the de-metalized areas 128 and 130 can be changed to tune the resonance frequency or the shape of the beam of the antenna 102.

The antenna 102 can include at least one slot 130 for defining a slot antenna 102. The slot 130 can be circular, rectangular, square, triangular, oval, etc. in shape. The antenna 102 can also be a metallization trace circular, rectangular, square, triangular, oval, etc. in shape laid on the metallized area 126 at the bottom of substrate 116. The antenna 102 can also be a combination of metallized and de-metallized areas 128, with or without a slot 130 or a metallized trace of the mentioned shapes, laid out at the bottom and top surfaces of substrate 116, coupled together by means of vias or electromagnetic coupling, to serve the purpose of creating a beam 120 at the frequency of operation of the microwave source 104 which is at or near the resonance frequency of the antenna 102. The antenna 102 can include multiple layers of substrates 116 with metallized and demetallized areas 128 on top or bottom surfaces, coupled through vias or by means of electromagnetic coupling, to serve the purpose of creating a beam 120 at the frequency of operation of the microwave source 104 which is at or near the resonance frequency of the antenna 102. Some embodiments can include more than one slot 130. In the exemplary embodiment shown in FIGS. 2A-2B, the antenna 102 includes one slot 130 that is circular in shape. The slot 130 extends in a circular path so as to envelope the hole 106 and the de-metalized area 128. A feed (formed by the metallization) can be coupled to the slot(s) 130.

The radiometer 108 can be an infrared camera 132, an infrared thermometer 134, etc. An infrared camera 132 can be used to view a large area, spanning from the heated region 120 to surrounding regions not directly heated by the microwave beam emitted by the antenna 102. Thus, the infrared camera 132 can be used to measure the temperature change at the center of the hole 106 (emitted from the heated region 120) to regions outside the heated region 120. Alternatively, an infrared thermometer 134 (e.g., MLX90614ESF-DCI, medical grade, 5° field of view, Melexis Technologies, Belgium) can be placed within the hole 106 to provide tissue temperature measurements at the heated region 120. Alternatively, the infrared thermometer 134 can be raised above the hole. The infrared thermometer 134 can be an infrared sensor, coupled to the controller 110 that reads the signal sent by the sensor to display, analyze, or record the temperature information. Placing the infrared thermometer 134 in the hole 106 can provide an added degree of thermal isolation for more precise, single point, measurements.

Figure 3A:
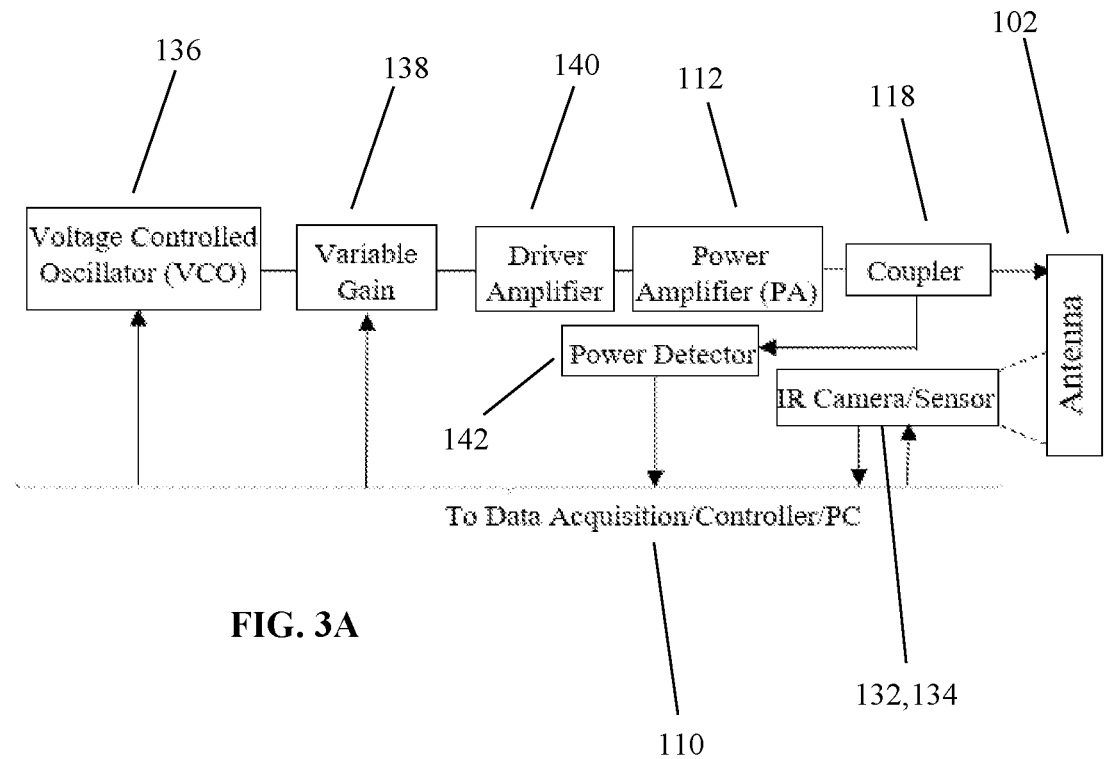
FIGS. 3A-B show exemplary system architectures, wherein FIG. 3A and FIG. 38 use variable gain and pulse width modulation respectively for adjustment of the average microwave power supplied to the antenna.
Figure 3B:
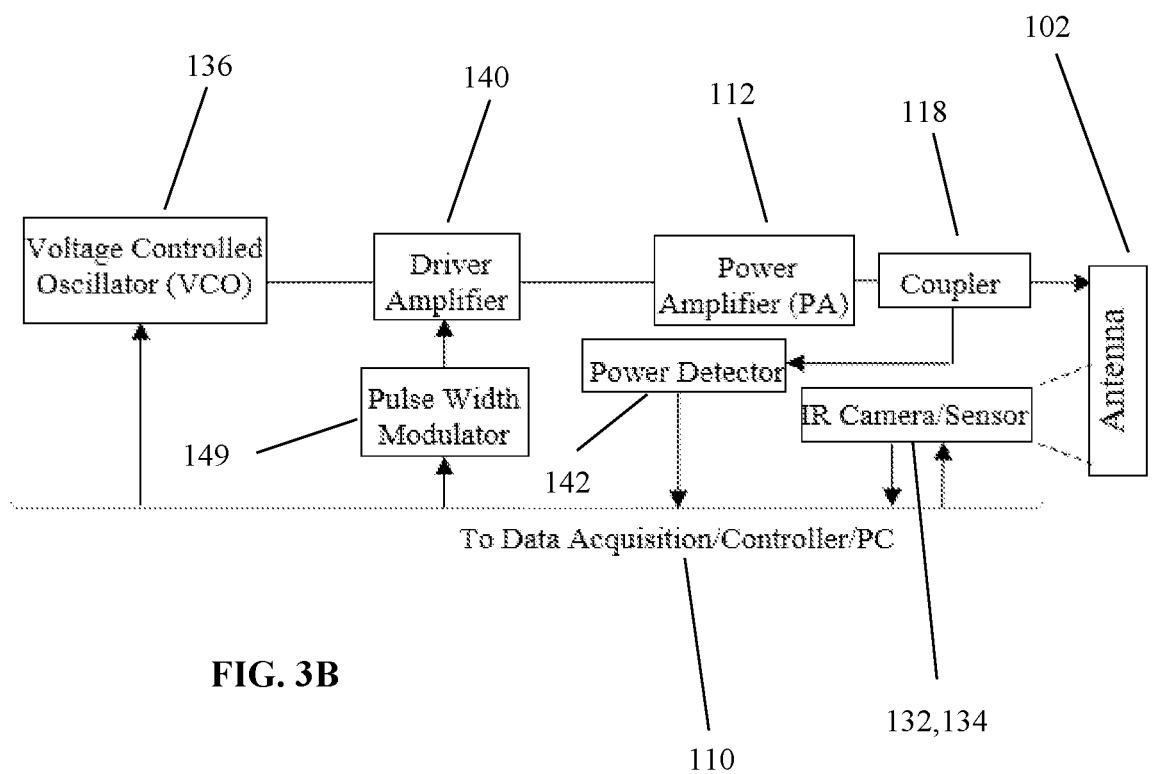

FIGS. 3A-B show exemplary system 100 architectures. The system 100 can include a voltage controlled oscillator (VCO) 136 (e.g., ZX-95-2536C-S, Mini-Circuits, Brooklyn, N.Y.) coupled to a variable gain 138 (FIG. 3A). The variable gain 138 can be coupled to a driver amplifier 140. The driver amplifier 140 (e.g., ZX60-272LN-S, Mini-Circuits, Brooklyn, NY) can be coupled to the power amplifier 112 (e.g., PA, 2.4 GHz WiFi signal amplifier, Szhuashi, China). The power amplifier 112 can be coupled to a coupler 118 (e.g., the coaxial feed 118). A power detector 142 can also be coupled to the coupler 118. The variable gain block 138 can be a variable attenuator (gain less than 1) or a variable gain amplifier (gain greater than 1) to serve the purpose of adjustment of the microwave power provided to the antenna 102. Alternatively, the variable gain 138 may not exist, and the microwave power adjustment can be accomplished by means of pulse width modulation (149, FIG. 3B). Any one or combination of the infrared camera 132 and/or infrared thermometer 134, the power detector 142, variable gain 138/or pulse width modulation 149, and the VCO 136 can be coupled to the controller 110. The microwave signal is originated by the VCO 136. The amount of microwave power is adjusted by the variable gain 138 or pulse width modulation 149. The controller 110 can control the VCO 136 for VCO 136 frequency adjustment. The controller 110, based on microwave power readings from the power detector 142, can control the variable gain 138 or pulse width modulation 149 for power adjustment. The microwave signal is then applied to the power amplifier 112 via the driver amplifier 140. The power amplifier 112 feeds the antenna 102 with the microwave power. The frequency of microwave radiation by the antenna 102 is the frequency of the incoming microwave power set by the power source at a resonance frequency of the antenna 102 or near that frequency. Microwave radiation by the antenna 102 generates the microwave beam. The microwave beam is emitted by the antenna and is incident upon the tissue, generating a heated region 120 on the tissue. The tissue is heated by the microwave beam and emits infrared radiation, at least a portion of which travels back through the hole 106. The infrared radiation emitted from the tissue (whether it is travelling back through the hole 106 or not) can be detected by the infrared camera 132. If the infrared thermometer 134 is used and placed within or raised above the hole 106, the infrared radiation travelling back through the hole 106 can be detected by the infrared thermometer 134. In either case, the infrared camera 132 and/or the infrared thermometer 134 transmits the heat signatures to the controller 110 for processing, which can include converting the heat signatures to temperature readings.

Figure 4:
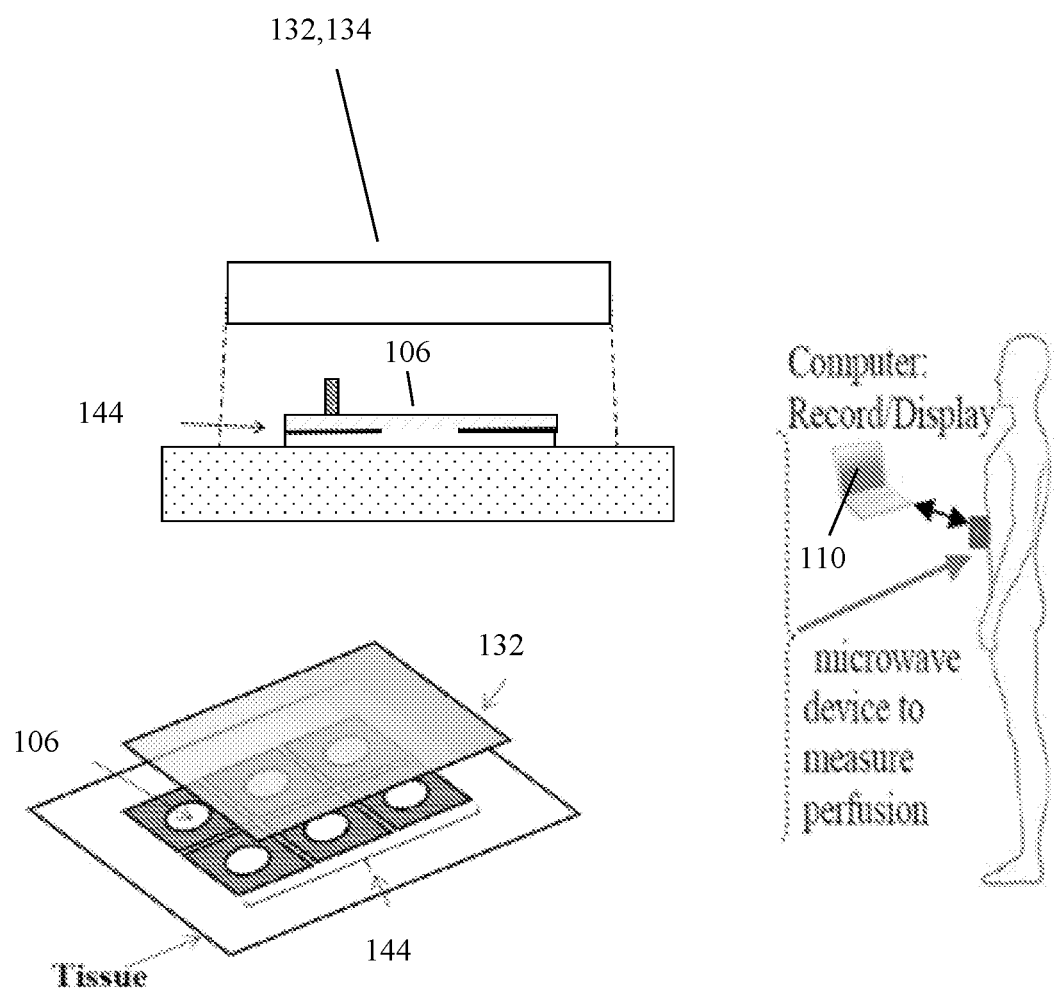
FIGS. 4-5 show an exemplary embodiment of an antenna configured as an array of antennas or an antenna array.
Figure 5:
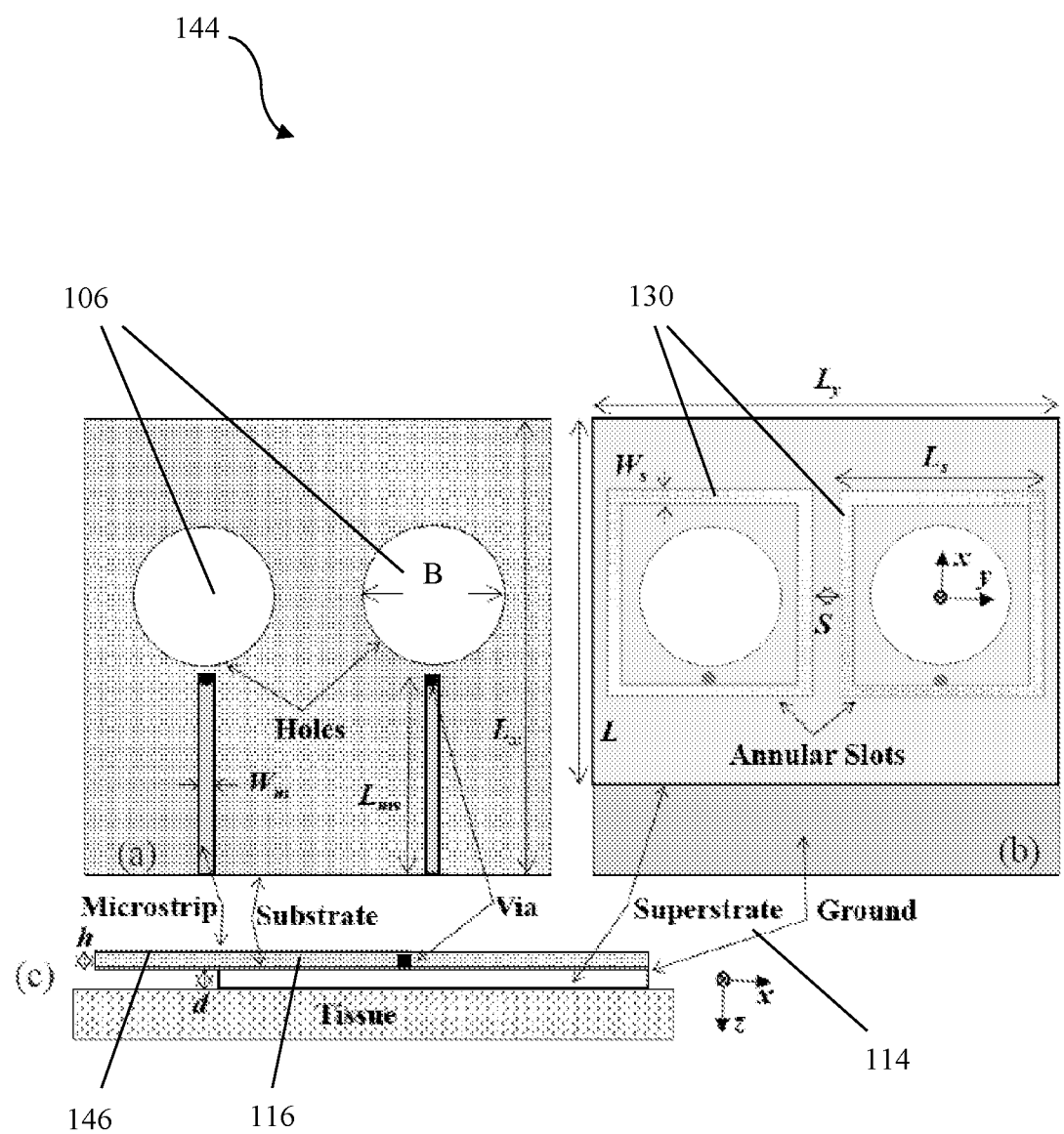

FIGS. 4-5 show an exemplary embodiment of an antenna configured as an array of antennas or an antenna array 144. For instance, the antenna array 144 includes a superstrate (e.g., silicone rubber) 114 and a substrate 116 (e.g., glass, silicon, etc.), wherein the superstrate 114 is disposed on a surface of the substrate 116. A top surface of the substrate 116 can include feed traces generated by metallization of the top surface. The superstrate 114 can be disposed on the bottom surface of the substrate 116. In use, the antenna array 144 is placed against the tissue with the superstrate 114 being adjacent the tissue. The superstrate 114 can serve as an overlay coating to prevent direct contact of the antenna metallization with the tissue. A plurality of holes 106 can be formed in the substrate 116. The plurality of holes 106 can be arranged in an array (e.g., a 2×2 array, 2×3 array, 5×6 array, etc.). The holes 106 can also be formed in the superstrate 114, if a superstrate 114 is used—i.e., each hole 106 passes through the substrate 116 and the superstrate 114. The substrate 116 and superstrate 114 can be made of flexible material to conform to the shape of body. Each hole 106 can have a diameter B. A coaxial feed 118, leading to the power amplifier 112, can be applied to a top surface of the substrate 116. There can be an individual coaxial feed 118 for each hole 106, one coaxial feed 118 for all of the holes 106, or any number of coaxial feeds 118 for any number of holes 106.

During operation, the antenna array 144 is placed against the tissue such that the superstrate 114 is adjacent the tissue. The controller 110 causes the microwave source 104 to generate microwave radiation, which is transmitted through the power amplifier 112 and directed to the antenna array 144. The antenna array 144 causes microwave radiation of the incoming microwave power, which is supplied by the power amplifier and tuned to a frequency (at or near the resonance frequency of the antennas) set by the microwave source, to generate a plurality of microwave beam output in the tissue. The microwave beams are caused to be incident upon tissue and are converted to heat at a plurality of heated regions 120, each coinciding with the plurality of holes 106 in the antenna array 144. The heated tissue emits infrared radiation that is directed back through the holes 106 to be monitored by the radiometer 108.

The antenna array 144 can have a substrate 116. The substrate 116 top surface 122 and a bottom surface 126. The top surface 122 can be coupled to the coaxial feed 118. The bottom surface 126 can have the superstrate 114 disposed thereon. The bottom surface (underneath the superstrate 114) can also be metalized. Metallization of the bottom surface 126 of the substrate 116 can involve forming a metallization layer 126 on the bottom surface. Removal techniques (e.g., etching) can be used to remove a portion of the metallization layer 126. For instance, a de-metalized area 128 can be formed within the metallization layer 126, the de-metalized area 128 being devoid of metallization. The de-metalized area 128 can have a shape. For instance, the de-metalized area 128 can have a circular area with a diameter C. It is contemplated for the circular area 128 to surround the hole 106 of diameter B. For instance, the circular area 128 can be formed on the substrate 116 bottom surface 126 at the periphery of the hole 106—i.e., the circular area 128 can be in the shape of an annular ring that surrounds the periphery of the hole 106. The shape, size, thickness, diameter, etc. of the de-metalized area and annular slot (130) can be changed to tune the resonance frequency of the antenna 102 and the shape of the beam 120. With the antenna array 144 there are a plurality of holes 106, and thus a plurality of de-metallized areas 128 can be formed, each de-metallized area 128 corresponding with a hole 106. For instance, the antenna array 144 can include a first hole 106 and a second hole 106. A first de-metalized area 128 can be formed at the periphery of the first hole 106 and a second de-metalized area 128 can be formed at the periphery of the second hole 106. This arrangement can be extended to any number of holes 106 forming the array.

The antenna array 144 can include includes slot 130 for each hole 106 for defining a slot antenna 102. The slot 130 can be circular, rectangular, square, triangular, oval, etc. in shape. In the exemplary embodiment shown in FIGS. 5A-C (FIG. 5A being a top view, FIG. 5B being a bottom view, and FIG. 5C being a side view), the antenna 102 includes one slot 130 for each hole 106, each slot being square in shape. Each individual slot 130 extends in a square path so as to envelope each individual hole 106 and its associated de-metallized area 128. Thus, sticking with the exemplary 2×1 hole array arrangement, a first de-metalized area 128 can be formed at the periphery of the first hole 106 and a first slot 130 can be formed so as to envelope the first de-metallized area 128. Alternatively, the first hole 106 may span such that to render the first de-metallized area 128 non-existent, thus making the first slot 130 directly surround the first hole 106. A second de-metalized area 128 can be formed at the periphery of the second hole 106 a second slot 130 can be formed so as to envelope the second de-metalized area 128. Alternatively, the second hole 106 may span such that to render the second de-metallized area 128 non-existent, thus making the second slot 130 directly surround the second hole 106. This arrangement can be extended to any number of holes 106 forming the array. Feed(s) (formed by the metallization) can be coupled to the slot(s) 130. Coupling from the surface 122 where the feed line(s) are attached to surface 126 where metallized and de-metallized are laid out can be achieved by means of vias or electromagnetic coupling. The array 144 can include multiple layers of substrates 116 with metallized and demetallized areas on top or bottom surfaces, coupled through vias or by means of electromagnetic coupling, to serve the purpose of creating a beam at the frequency of operation of the microwave source 104, which is at or near the resonance frequency of the antenna 102. Some embodiments can include more than one slot 130.

The antenna array 144 configuration can be used to provide measurement of perfusion/thermoregulatory response for heating across a region of tissue, as opposed to a single-point—i.e., the antenna array 144 configuration generates multiple heated regions 120, allowing measurement of perfusion/thermoregulatory response of the region comprising the multiple heated regions 120. In other words, the plurality of holes 106 of can be used for a multipoint assessment of the thermoregulatory response.

Figure 6:
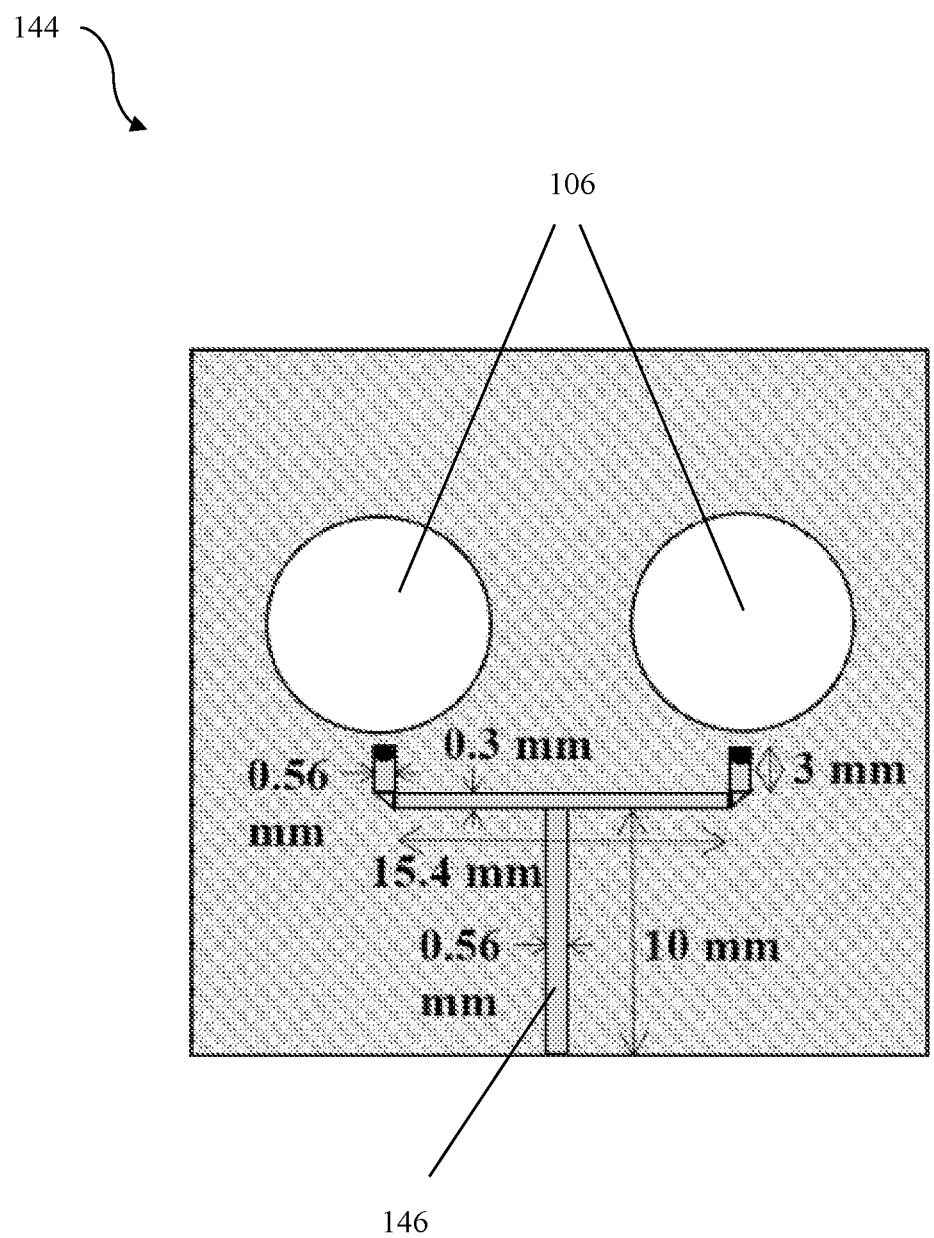
FIG. 6 shows an exemplary embodiment of the antenna array having a microstrip feed network.

FIG. 6 shows an exemplary embodiment of the antenna array 144 having a microstrip feed network 146 (formed by metallization). The microstrip feed network 146 can be configured as a radio frequency (RF) circuit that allows for power splitting. Thus, the microstrip feed network 146 can serve as a power splitter to direct a defined amount of the microwave power to an antenna 102 using a slot 130 as a means of radiation. For instance, a microstrip feed network 146 can be formed between a first slot 130 and a second slot 130 of the antenna array 144. The microstrip feed network 146 can be coupled to the coaxial feed 118 so that the power of the microwave radiation being supplied to the antenna array 144 can be split in defined amounts between the first slot 130 and the second slot 130. The arrangement of the microstrip feed network 146 shown in FIG. 6 is exemplary, and thus it is understood that other arrangements can be formed, which can include more than one microstrip feed network 146, any number of slots 130 being connected to any number of microstrip feed networks 146, etc. Alternatively, radiation can be achieved by other shape of metallization or de-metallization of the surfaces 122 and 126 to function as alternative types of antennas such as patch, strip, meandered, etc.

Figure 7:
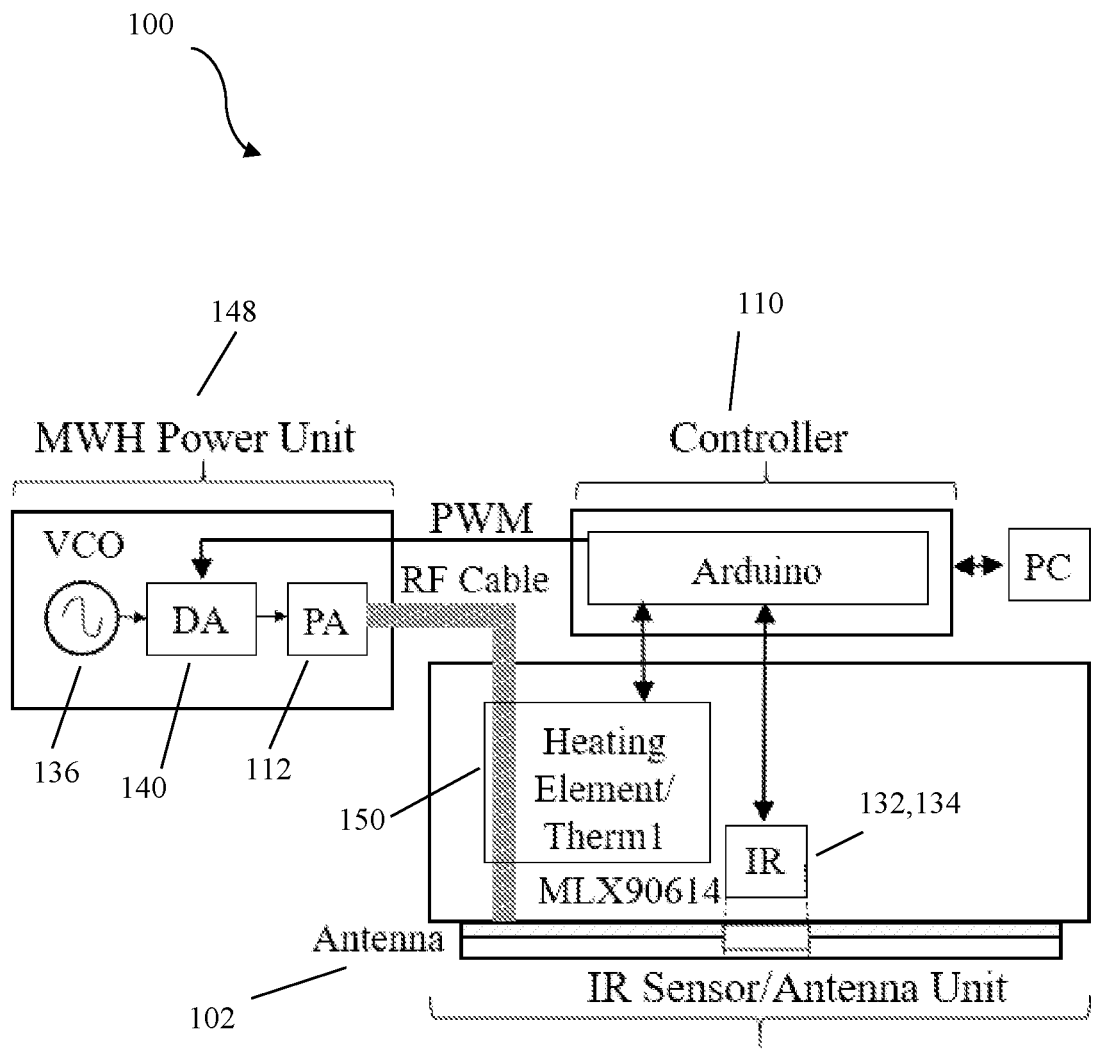
FIG. 7 shows an exemplary system architecture configured to provide a closed-loop (feedback) temperature control for regulating microwave heating with a set (target) temperature.

Referring to FIG. 7, the system 100 can be configured to provide a closed-loop (feedback) temperature control. Use of the feedback temperature control facilitates automatic control of the applied microwave radiation power as a predetermined temperature rise is being reached, thereby allowing for control of the rise in temperature. This can be achieved via a pulse width modulation (PWM) technique to control the administrated microwave radiation power to the tissue. Transient and steady-state responses of both the temperature and the average PWM voltage provide alternative means of assessing the thermoregulatory response to the microwave radiation energy.

Figure 25:
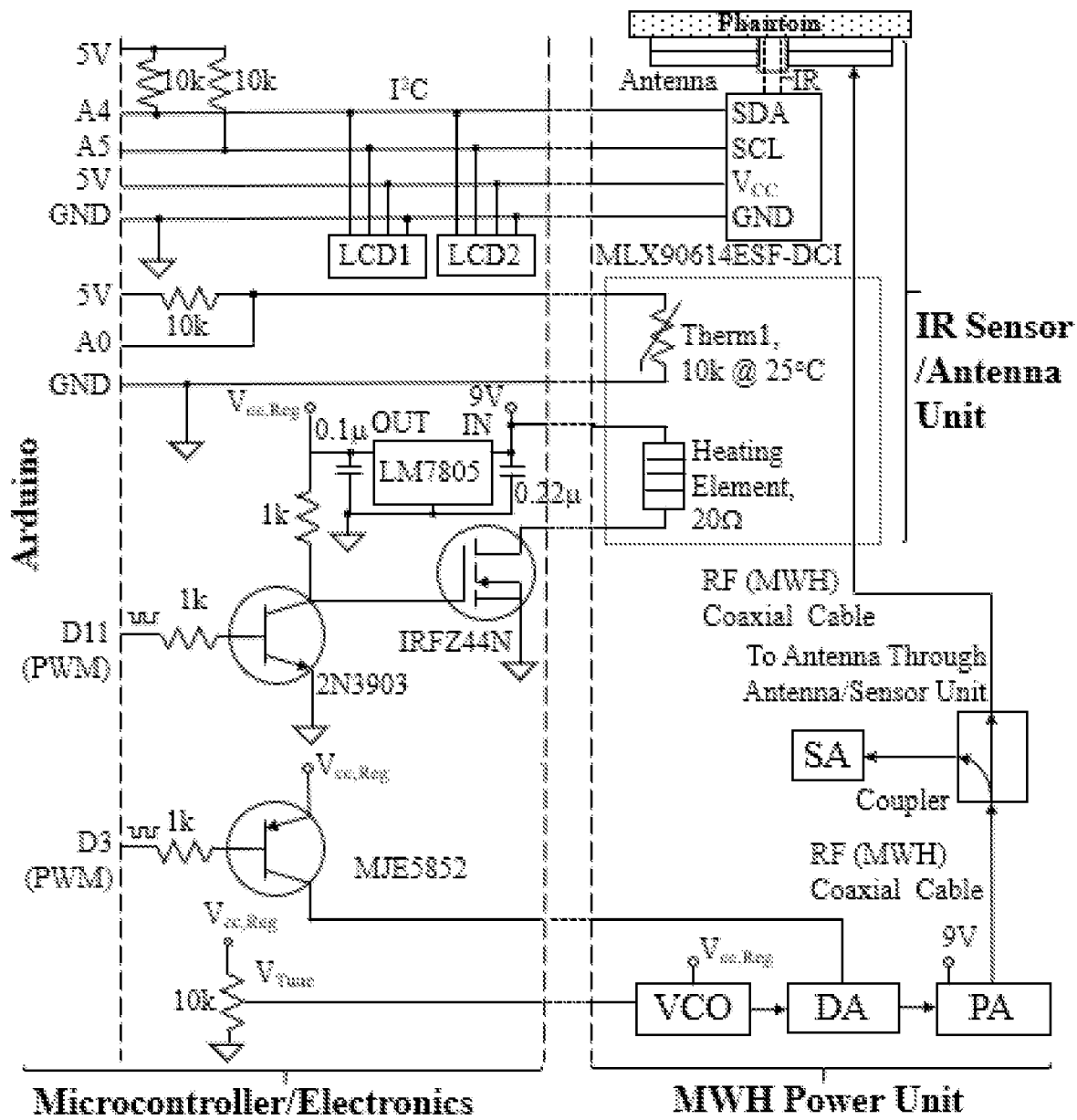
FIG. 25 is a schematic showing the system circuitry, components, and interconnections for microwave heating temperature control using pulse width modulation.

FIG. 7 shows an exemplary configuration in which the feedback temperature control includes: 1) a microwave power unit 148, a unit supporting the antenna 102, and a controller 110. The microwave power unit 148 includes a VCO 136, a driver amplifier 140, and a power amplifier 112. The system 100 can also include a transistor switch (FIG. 25) to turn the power supply to the power amplifier 112 or driver amplifier 140 on and off according to PWM pulses (e.g. 0 and 5 V). The full range of power for 100% PWM duty cycle can be set to the highest power available by the power amplifier 112, which can be measured for a dummy 50Ω matched load. It should be noted that the full range will change depending on the degree of mismatch between the antenna 102 and the tissue due to their contact interface. The unit supporting the antenna 102 can include a heating element 150 wrapped around a radio frequency cable and a thermistor (Therm1). The purpose of the heating element is to minimize the conductive heat transfer between the unit and a tissue at physiological temperature (skin temperature ~35° C.). This is achieved by increasing the cable temperature (from the room temperature ~20° C.) to reduce the temperature difference between the inside the unit/cable and the subject/patient skin temperature at the start of the measurement and before turning on the microwave heating. This configuration allows for the control of the heating element 150 via a pulse width modulation (PWM) feedback signal which is run by the controller 110 simultaneously with the pulse width modulation 149 for the microwave power adjustment. The controller 110 shown in FIG. 7 is an Arduino Nano microcontroller board. An embodiment of the circuitries and interconnection for the system as controlled by the controller is shown in FIG. 25. The controller 110 can include, or be connected to, at least one display (e.g., a liquid crystal display). The display(s) can graphically or textually display the recorded tissue temperatures and PWM values. A power transistor (e.g., IRFZ44N MOSFET) can be used to drive the heating element 150. The system 100 can further include thermistor reader circuitry for reading the temperature of the heating element 150 and a potentiometer to adjust the tuning voltage of the VCO 136. For instance, the voltage can be tuned for operating the system 100 at 2.4 GHz. These circuitries can incorporate basic instrumentation electronics and are detailed in FIG. 25. The system 100 can be configured to run on a 5 V supply voltage for most circuitries except the power amplifier 112 that uses a higher supply voltage (e. g. 9 V) to create high microwave power. The 5 V supply available by Arduino can supply some circuitries. A 5 V voltage regulator (e. g. LM7805) may be used to create the 5 V supply for some other circuitries. In the exemplary system 100 configuration, the PWM is implemented in Arduino software, which also reads the temperature of the cable/heating element and tissue and process them.

Example I

Exemplary Antenna with Hole and Circular Area

Figure 8:
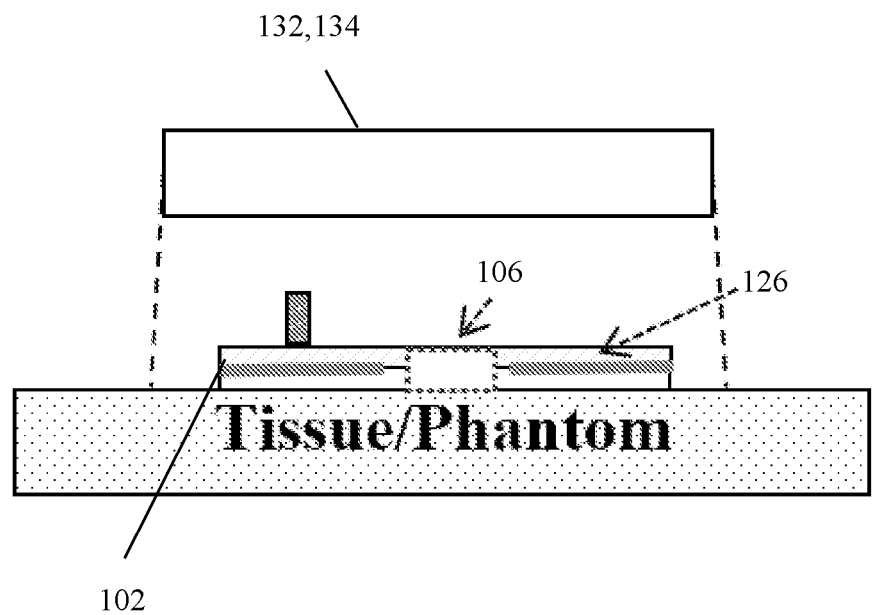
FIG. 8 shows the schematic of the test setup for testing an embodiment of the antenna.

An embodiment of the antenna 102 configuration of FIGS. 2A-B was constructed and tested. The studies were conducted to test the system 100 for measuring blood perfusion on human skin and small animal skin, and thus the heating was performed at 2.4 GHz, i.e. a shallow heating volume of about 2 cm deep. For purposes of the study, and in reference to FIGS. 2A-B, the diameter of the slot 130 is selected to be D=22 mm, exhibiting a broad $S_{11}$ resonance around 2 GHz. The substrate material is FR4 with height 1.52 mm and a nominal dielectric constant value of 4.4. The superstrate is a 2.4-mm-thick commercial grade silicone rubber coating (GE Silicone II) with the dielectric constant and loss tangent of 3.12 and 0.01 respectively. A hole 106 with diameter B of about 8 mm is formed into the antenna 102. To secure the coaxial line to the antenna 102, a square shape landing flange of G=10 mm is used. In addition, $W_r$=1 mm, h=1.52 mm, d=2.4 mm, and G=10 mm. The coaxial feed 118 is applied from the top of the substrate 116, which is partly metalized (G×G). The metallization layer 126 is partially removed to generate a de-metalized area with diameter C. FIG. 8 shows the schematic of the test setup.

Figure 9:
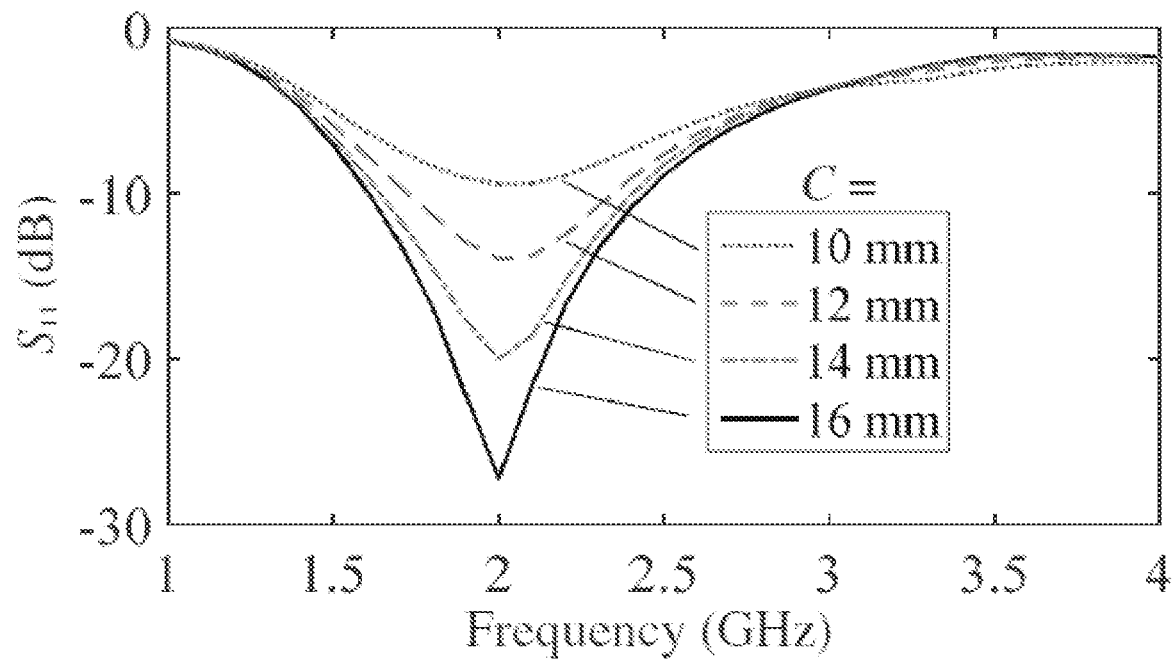
FIG. 9 illustrates the variation of the reflection coefficient ($S_{11}$) by varying the diameter of the de-metallized area formed in an embodiment of the antenna.

High Frequency Simulation Software (HFSS) simulations are performed to study the impact of the diameter of the de-metallized area 128 and hole 106 to assess antenna 102 performance. The Muscle tissue Cole-Cole model is considered in the simulation. FIG. 9 illustrates the effect of varying C on the reflection coefficient, $S_{11}$ (B=8.2 mm). Note that with increasing C, the resonance becomes deeper and its frequency moves slightly to the left.

Figure 10:
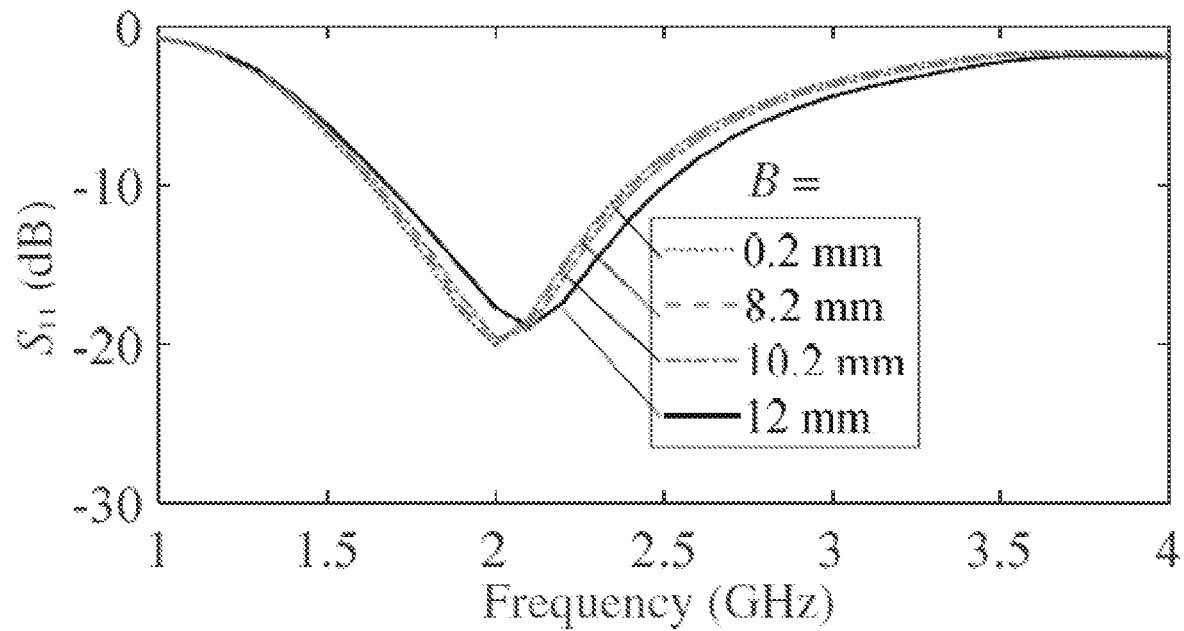
FIG. 10 illustrates the variation of the reflection coefficient ($S_{11}$) by varying the diameter of the hole formed in an embodiment of the antenna.
Figure 11:
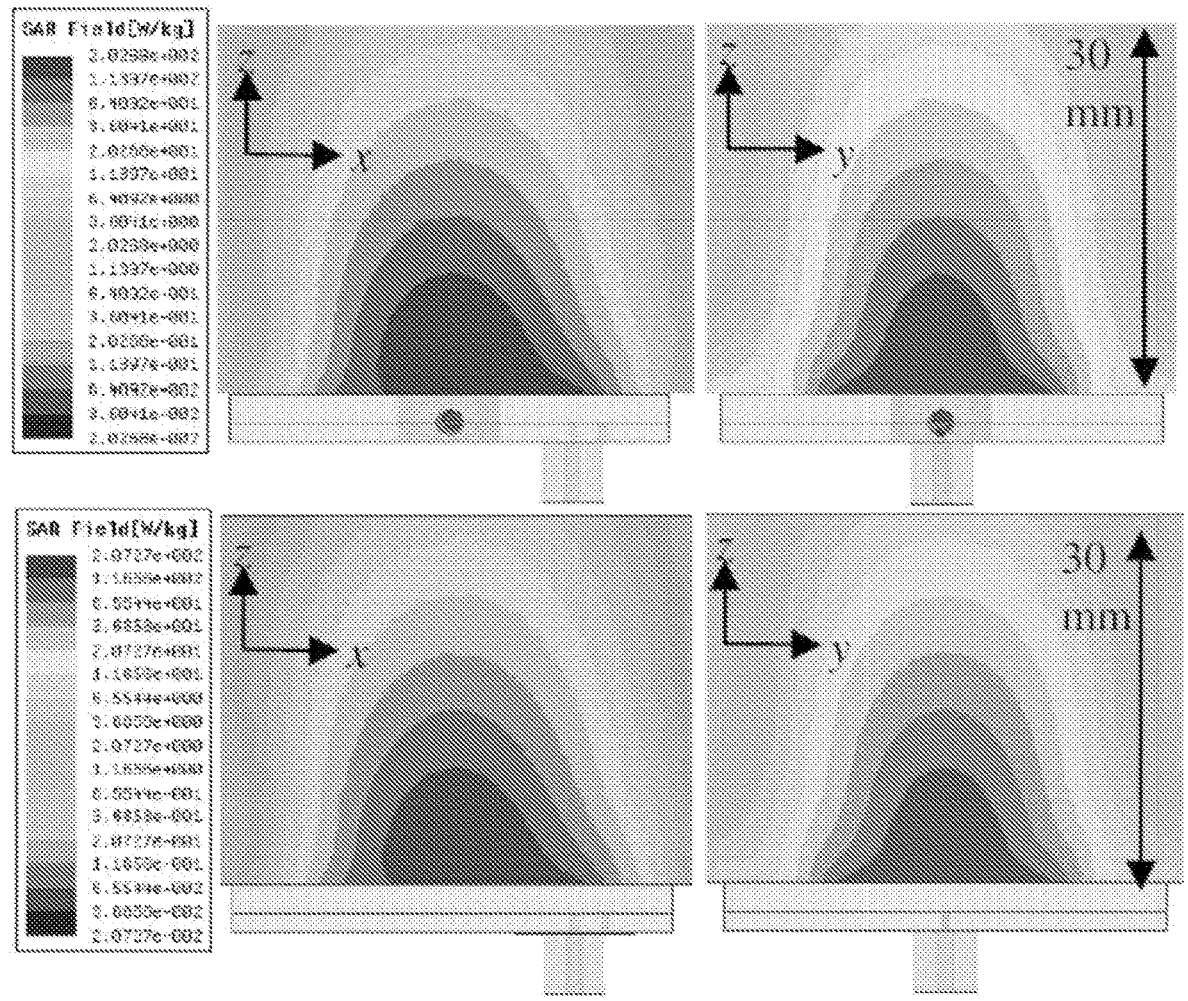
FIG. 11 shows a simulated specific absorption rate (SAR) plotted for xz and yz planes, at 2.4 GHz, for 1 W of source power, for an embodiment of the antenna for 12-mm-diameter de-metallized area; top: with 8.2-mm-diameter hole, bottom: without the hole.
Figures 12A, 12B, 12C, 12D:
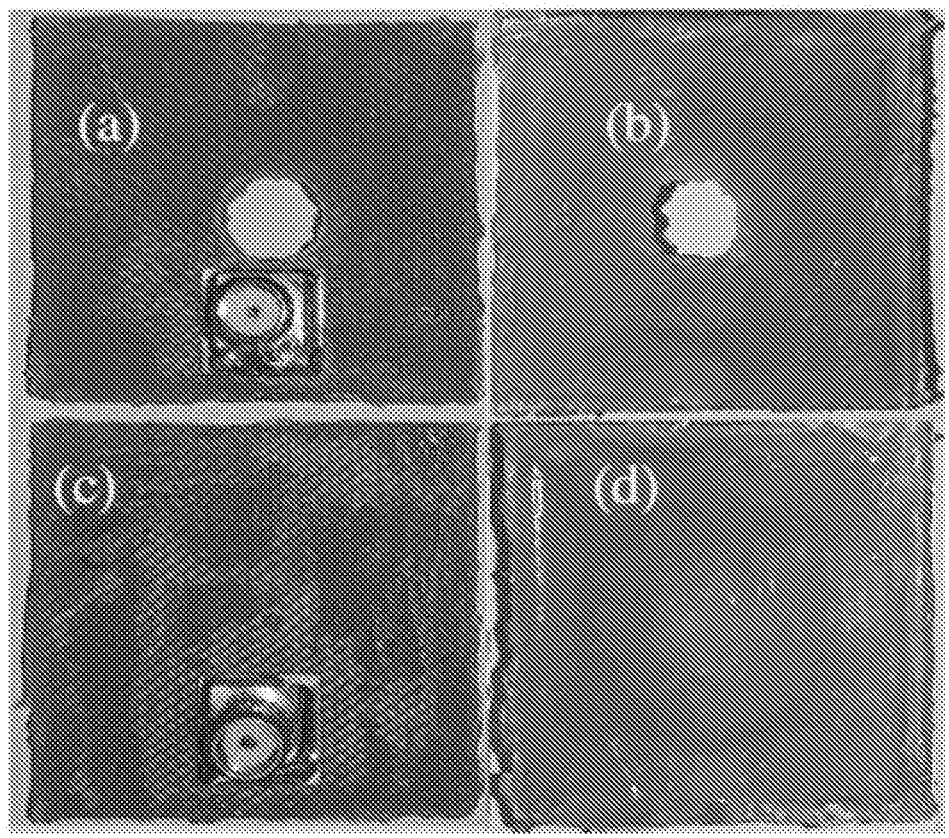
FIGS. 12A-D show fabricated antennas used for a test study, top: with 8-mm-diameter hole (top and bottom views), bottom: without the hole (top and bottom views).

FIG. 10 illustrates the effect of varying B on $S_{11}$ (C=12 mm). Note that no significant difference between graphs for B up to about B=10 mm exists, while the resonance shifts upward as B approaches C. The impact of the B=8.2 mm hole 106 on the field profile, i.e. the specific absorption rate (SAR), is shown in FIG. 11, plotted at 2.4 GHz for 1 W of source power (C=12 mm). FIG. 11 shows simulated SAR plotted for xz and yz planes, at 2.4 GHz, for 1 W of source power (C=12 mm). The top images are for an antenna 102 with the B=8.2 mm hole. The bottom images are for an antenna 102 without the hole (B=0 mm). The beams are almost identical, demonstrating no impact of the hole 106 on the SAR profile, except for minor scaling of the intensity values, due to a slight difference in $S_{11}$ and thus the power delivered to the antenna 102 between the two cases in the simulation. In addition, the beam profile on the yz plane is symmetric, while the beam profile over the xz plane (passing through feed) shows slight asymmetry, with more intensity at lower depth toward the feed point.

Figure 13A:
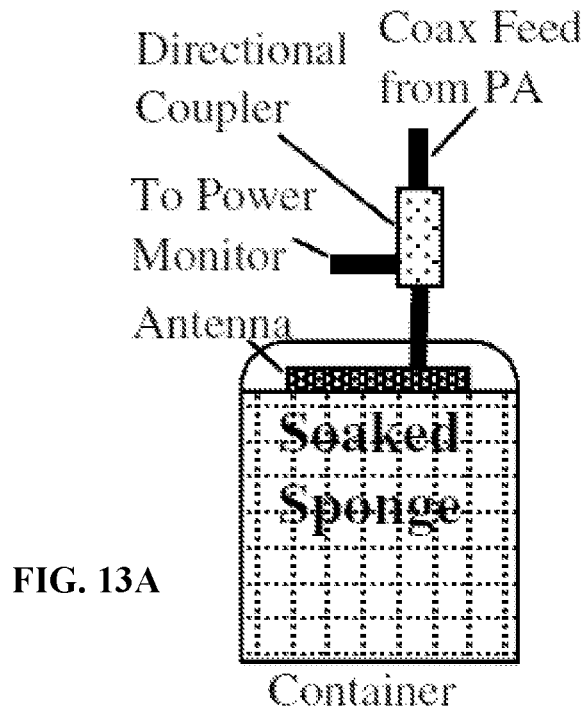
Figure 14:
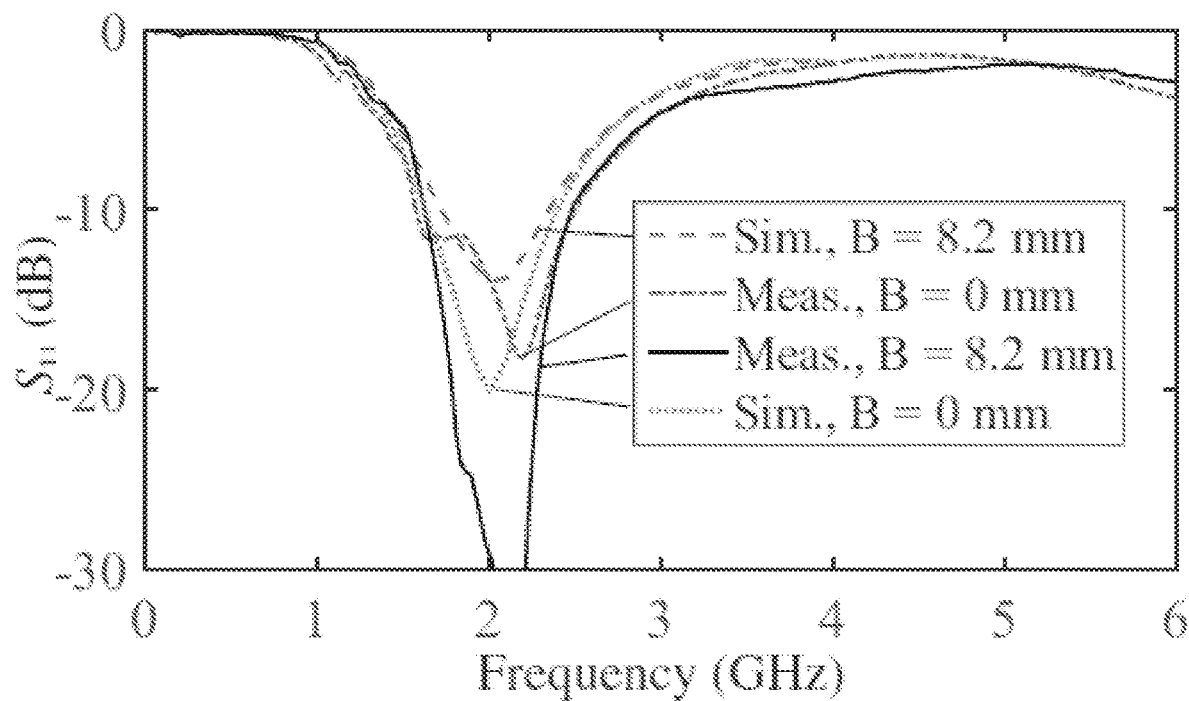
FIG. 14 shows simulated and measured reflection coefficient ($S_{11}$) for tests conducted on an embodiment of the antenna, conducted on the basic setup of FIG. 13A.

The fabricated antennas 102 are shown in FIGS. 12A-D, for with (W) and without (WO) the B=8.2 mm diameter hole (C=12 mm). The schematic of the experimental setup is shown in FIG. 13A with a soaked sponge used as the muscle phantom having complex permittivity close to that of muscle. Simulated and measured results with and without the B=8.2 mm diameter hole 106 are illustrated in FIG. 14, where $S_{11}$ of the antenna 102 against the soaked sponge is measured using an 8720C HP vector network analyzer (VNA). Note that resonance frequencies of the measured antennas 102 are slightly higher than those for the simulation, likely due to a smaller dielectric constant of the actual FR4 substrate 116 used for fabrication as compared with the simulated one. Nonetheless, it appears that the resonance frequency does not change between cases with and without the hole 106. The impact of the hole 106 is manifested in the depth of the resonance that is well below −10 dB value (90% power delivery) for all cases. Since the antenna 102 is used for 2.4 GHz heating, the $S_{11}$ values for the cases of with and without the B=8.2 mm diameter hole 106 are compared in Table 1 (C=12 mm), for both simulation and measurement. Measured value is −12.5 dB for both cases.

TABLE 1

$S_{11}$ AT 2.4 GHZ FOR WITH (W) AND WITHOUT (WO) THE B = 8.2 MM DIAMETER HOLE (C = 12 MM).

| WO (Sim.) | WO (Meas.) | W (Sim.) | W (Meas.) |
|---|---|---|---|
| −10.2 dB | −12.5 dB | −9.1 dB | −12.5 dB |

Figure 15:
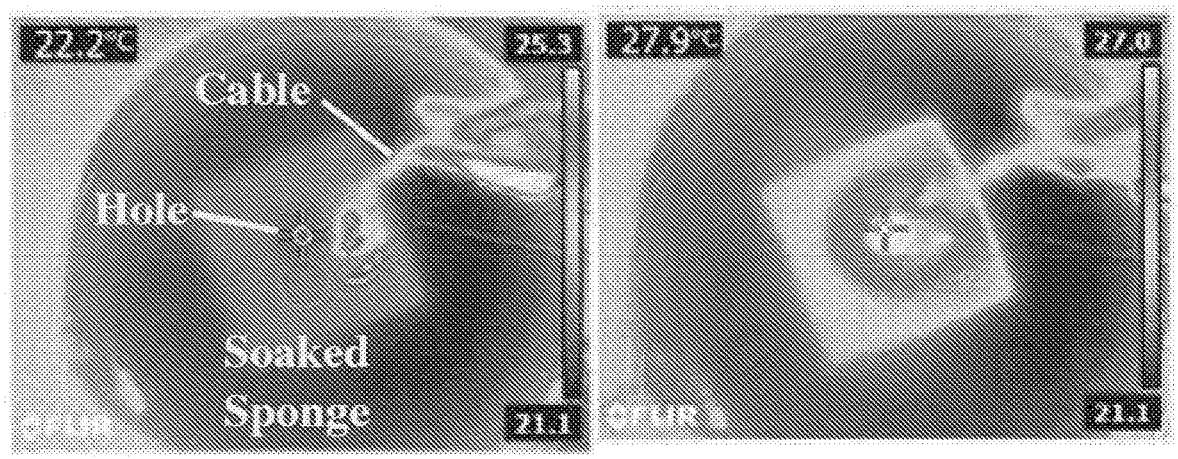
FIG. 15 shows infrared images for a heating episode for a power of 2 W and at 2.45 GHz for an embodiment of the antenna, conducted on the basic setup of FIG. 13A.

The presence of the hole 106, introduced at the middle of the antenna 102, has minimal impact on the antenna 102 performance, in terms of $S_{11}$ or SAR profile, while allowing for infrared beam to reach the skin/phantom. An infrared camera 132 is used to view a large area, spanning from the heated region 120 at the center of the applicator's beam to surrounding regions not directly heated by the antenna beam. Applying a power of 2 W at 2.45 GHz on the phantom of FIG. 13A soaked with saline with dielectric property close to muscle, it took a short time (1 minute) to raise the temperature at the middle of the hole 106 by 5.7° C. (see FIG. 15). Thus, shorter measurement time (less than a minute) with 2 W applied power can be achieved if temperature rise to no more than 2° C. is desirable. On the other hand, less power is needed for the temperature rise of 2° C. within one minute.

Example II

Exemplary Antenna Array

An embodiment of the antenna array 144 configuration of FIGS. 4-5 and system 100 configuration of FIG. 1 were constructed and tested. The antenna array 144 was constructed and used to perform multi-point measurement of the thermoregulatory response, and thus perfusion. The thermal responses at the holes 106 were simultaneously measured using an infrared camera 132. The recorded temperature for each hole 106 is individually processed by a supporting data processing platform. A 2×1 antenna array (see FIG. 5) operating at 2.45 GHz is designed for the study. The antenna array 144 is a microstrip-fed annular slot antenna with rectangular shape. To make the hole 106 to hole 106 spacing small, a high dielectric constant substrate 116 (Rogers 3010) with $\varepsilon_r$=10.2 and tan δ=0.0035 is used. Annular slots 130 are with rectangular shape, rather than circular, to make a better use of the available space.

A superstrate 114 overlay coating made of commercial grade silicone rubber coating (GE Silicone II) is used to prevent direct contact of the antenna metallization layer 126 with the tissue. The simulation is done for muscle tissue with the Cole-Cole model. The slots 130 are microstrip fed to allow for low profile feed structure, readily extendable to situations with multi-antenna array systems. The microstrip lines are connected to the inner metallization, enclosed by slots, through vias placed right after the lines crossing over the slots. The two microstrip lines/slots constitute a two-port network. Dimensions shown in the figure are obtained after some trial and error, with the goals of small profile, large enough hole, and $S_{11}$ and $S_{22}$ below −10 dB. The microstrip lines are with 50Ω characteristic impedance. The dimensions of the FIG. 5 antenna are D=10 mm, $W_s$=1 mm, $L_s$=14 mm, $L_x$=31 mm, L=24 mm, $L_y$=32 mm, $L_{ms}$=13 mm, $W_{ms}$=0.56 mm (50Ω), S=2 mm, d=1 mm, and h=0.635 mm (25 mils).

Figure 16:
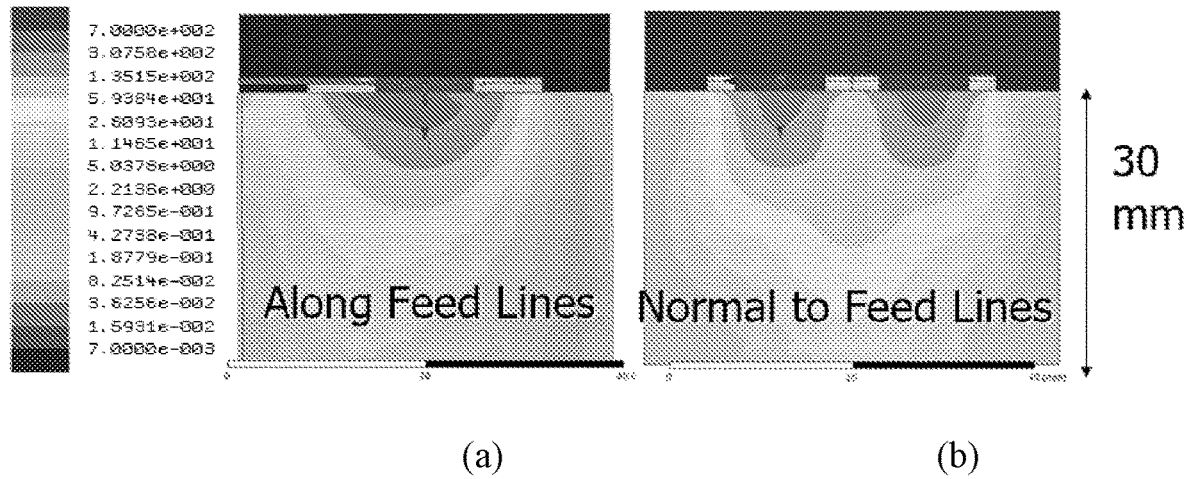
FIG. 16 shows simulated SAR plots for an embodiment of the antenna array; a) xz plane and b) yz plane, for the available source power of 1 W at each port and at 2.45 GHz.
Figure 17:
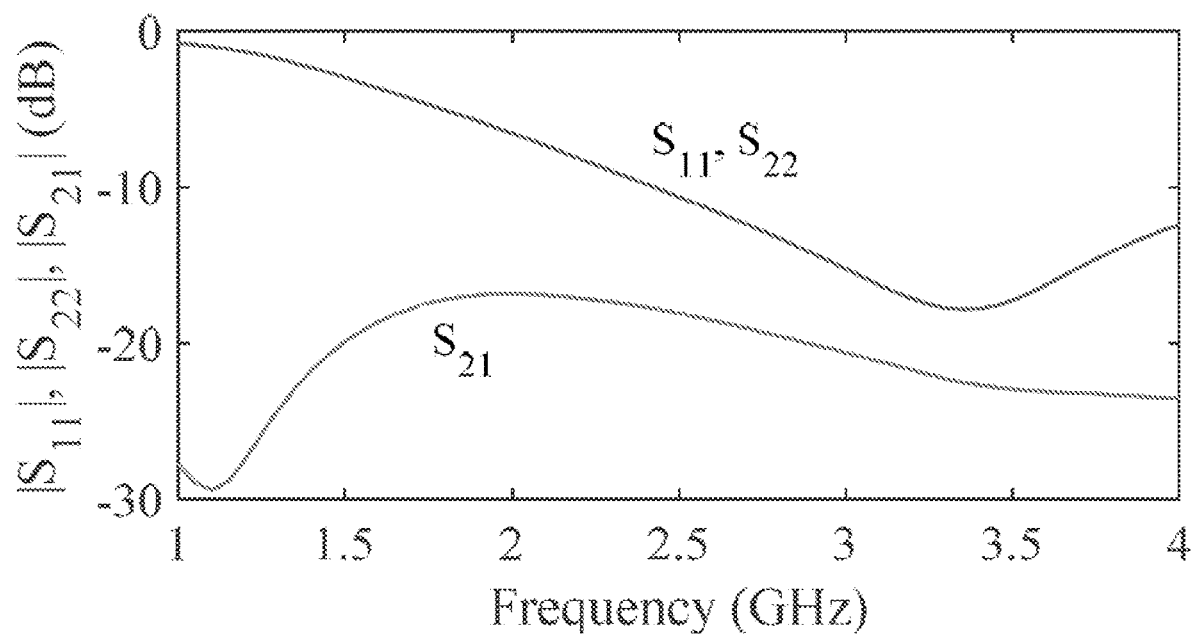
FIG. 17 shows simulated S parameters (two-port) for an embodiment of the antenna array (two by one).

After the simulation, S parameters are de-embedded to right above the slots 130 so a matching feed network can be designed (as explained later). The HFSS model along with the specific absorption rate (SAR) profiles at xz and yz planes at 2.45 GHz and for 1 W available source power at each antenna 102 are shown in FIG. 16. FIG. 16 shows simulated SAR plots; a) xz and b) yz planes for the available source power of 1 W at each port and at 2.45 GHz. FIG. 16 demonstrates a quite symmetric SAR profile for the yz plane. The xz SAR profile is appropriate, but is slightly extended toward the microstrip feed line. The main observation is a high SAR/heating area mostly concentrated under the holes 106. FIG. 17 displays the de-embedded two-port S parameters. Interestingly, $S_{11}$ and $S_{22}$ are below −10 dB at above 2.4 GHz, demonstrating a broadband response.

Figure 18:
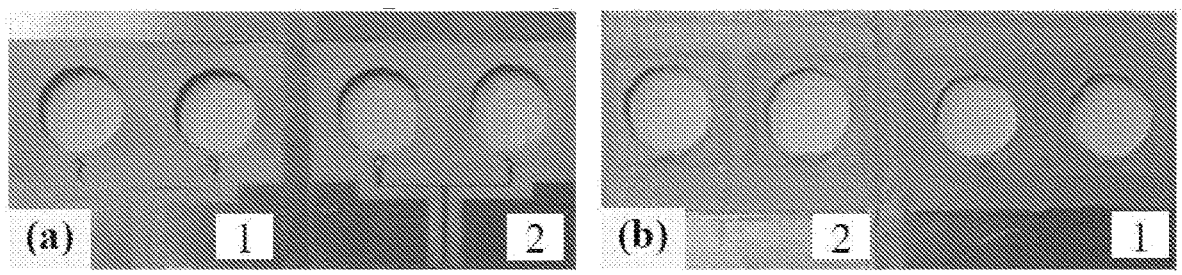
FIG. 18 shows fabricated antenna arrays used for a test study; a) top view and b) bottom view.
Figure 19:
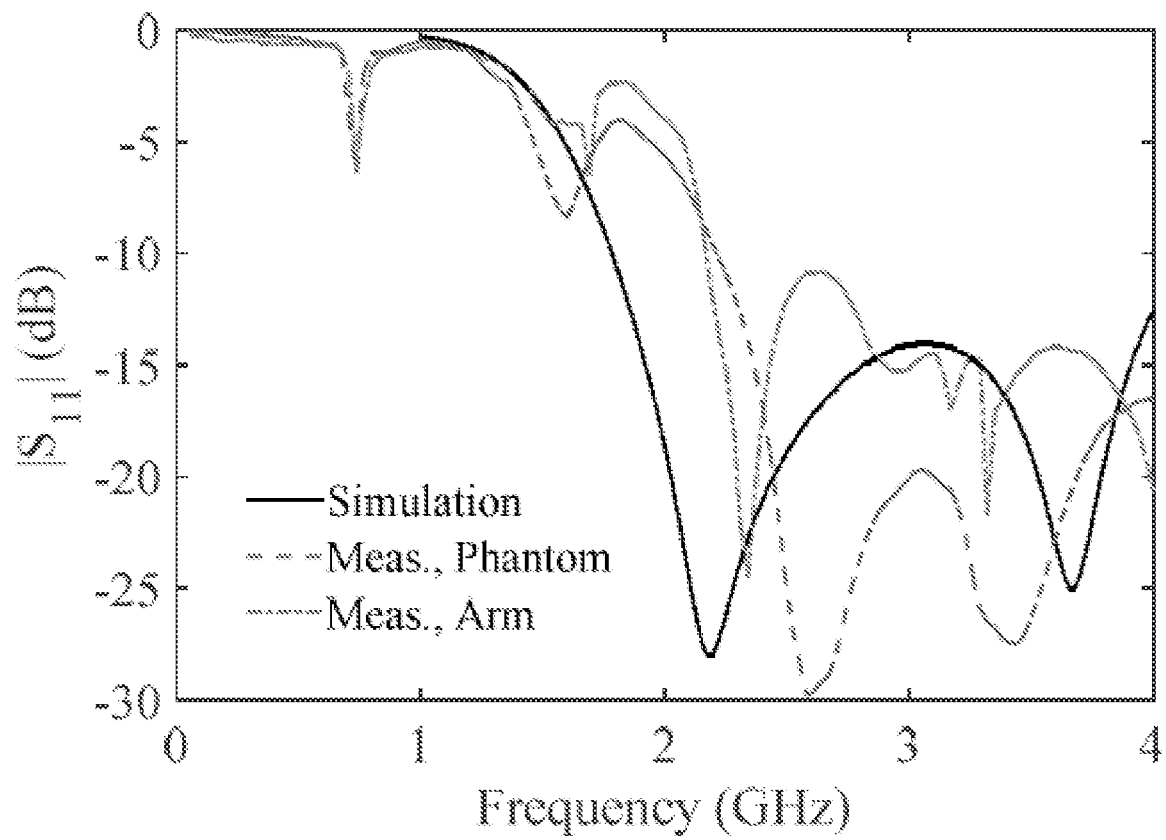
FIG. 19 shows simulated and measured results of the reflection coefficient ($S_{11}$) for tests conducted on an embodiment of the antenna array (two by one). Measurement is conducted on the basic setup of FIG. 13A.

The fabricated antenna arrays 144 are shown in FIG. 18. Two antenna pairs are built next to each other. The first pair (#1) is used for heating, while the second pair (#2) serves as a control. The $S_{11}$ for pair #1 was measured using a calibrated HP8720C vector network analyzer (VNA) after connecting a right angle SMA end launcher to it. The measurement was performed by placing the antennas 102 on both a soaked sponge (permittivity similar to tissue) and on the lower arm, as shown in FIG. 19. Fine features of $S_{11}$, such as the resonance depths, are generally very sensitive to the placement of the antenna 102 over phantom/tissue. In particular, the flexing of the semi-flexible Rogers 3010 substrate 116 has some noticeable impact if air pockets exist between the superstrate 114 and phantom/tissue. FIG. 19 presents typical measurements when best effort was made to make a proper contact between the superstrate 114 and the phantom/arm. FIG. 19 indicates a broadband response, where $S_{11}$ remains below −10 dB above about 1.8 GHz and 2.2 GHz for the simulation and measurement respectively to beyond 4 GHz. In addition, $S_{11}$ at 2.45 GHz is −20.5 dB, −20 dB, and −14 dB for simulation, measurement/phantom, and measurement/arm respectively.

Figure 20:
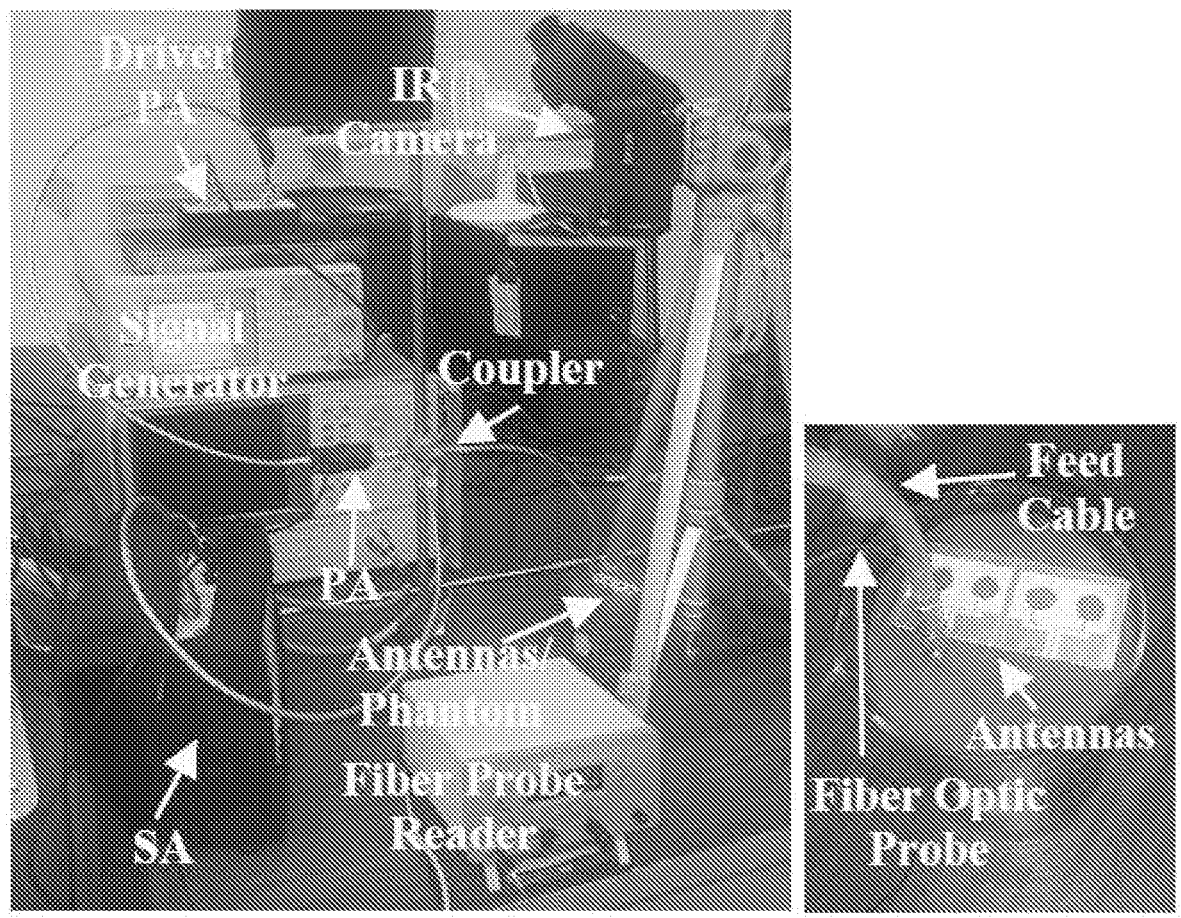
FIG. 20 shows the measurement test setup for testing an embodiment of the antenna array.

The measurement setup is illustrated in FIG. 20. The antenna arrays 144 are placed on the water soaked sponge phantom. The signal from an Agilent N9310A signal generator is boosted by a cascade of two Wi-Fi amplifiers serving as a driver and a power amplifier (PA). The antenna array 144 power is monitored using a 20 dB directional coupler and a spectrum analyzer (SA). An infrared camera 132 (e.g., FLIR T640, FLIR Systems, Wilsonville, OR) records the thermal image. The infrared camera 132 is placed about 1 m above the antenna arrays 144.

Figure 21:
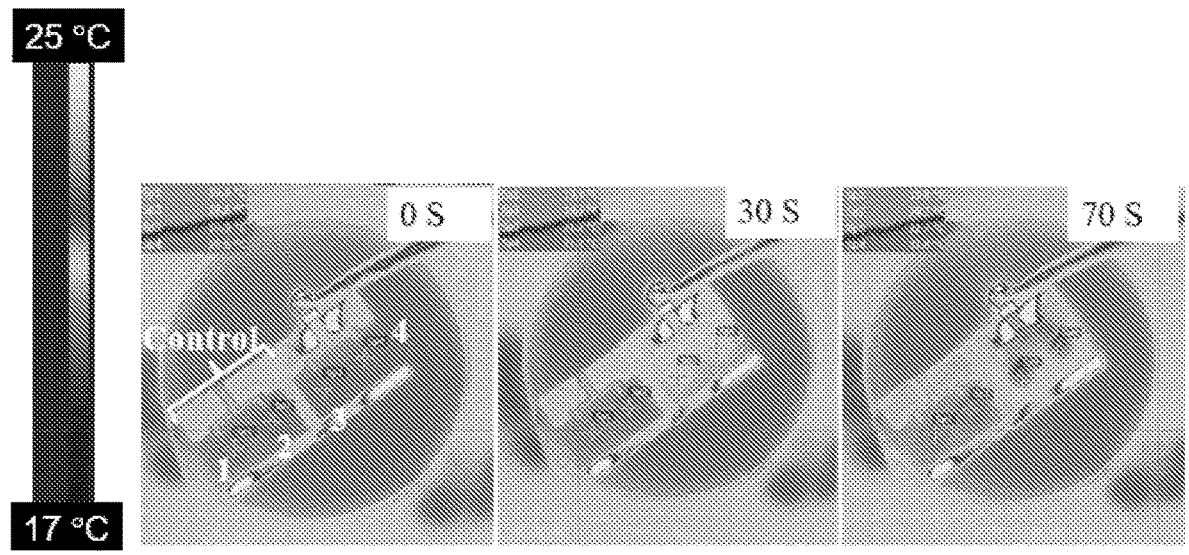
FIG. 21 illustrates infrared camera thermal images, for the microwave radiation power of 2 W at 2.45 GHz on a test setup, at right before (left), 30 seconds after (middle), and 70 seconds after (right) applying the microwave radiation. Radiation is applied in holes 3 and 4, while holes 1 and 2 are control (no radiation).

FIG. 21 illustrates the infrared camera thermal images, for the microwave radiation power of 2 W at 2.45 GHz, at right before (left), 30 seconds after (middle), and 70 seconds after (right) applying the microwave radiation. Temperature for holes 106 marked as 1, 2, 3, and 4 are also recorded. The holes 106 marked as 1 and 2 are control pair, while holes 3 and 4 represent the heated pair. The amount of heating in this study is more than what is deemed appropriate for perfusion measurement (2° C.) and is for demonstration purpose.

Figure 22:
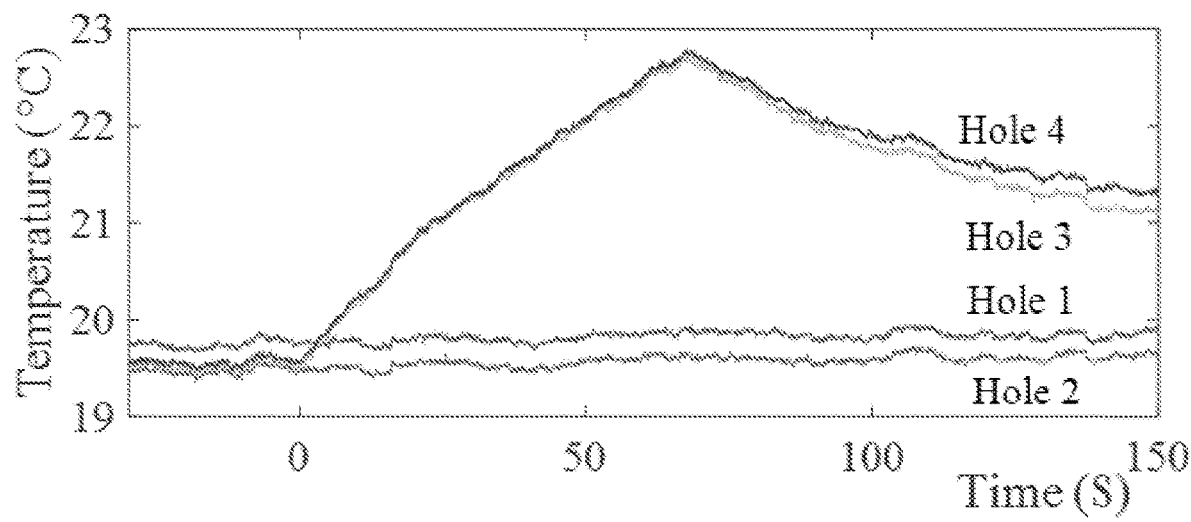
FIG. 22 are graphical plots of the temperature response at holes 1, 2, 3, and 4. Radiation is applied in holes 3 and 4, while holes 1 and 2 are control (no radiation).

Graphs of the temperature response at holes 1, 2, 3, and 4 are plotted in FIG. 22. The hole 106 temperatures from the infrared camera 132 are averaged over the hole 106 area. The temperature of the control holes 1 and 2 do not rise during the experiment but it rises for heating holes 3 and 4, indicating local beams and heating zones under the heating antennas. The difference between the baseline temperature for the hole 1 (19.8° C.) compared to the baseline temperatures for holes 2, 3, 4 (19.5° C.) is due to the fact that the phantom is not thermally isolated from the surrounding environment, and some variation may be expected. The feed cable 118 is above the room temperature as evidenced in FIG. 21 because it is connected to the power amplifier (112). The similarity of temperature reading between holes 3 and 4 is consistent with FIG. 21, indicating an almost equal power split as the antennas in the array 144 make similar contact with the phantom.

Figure 23:
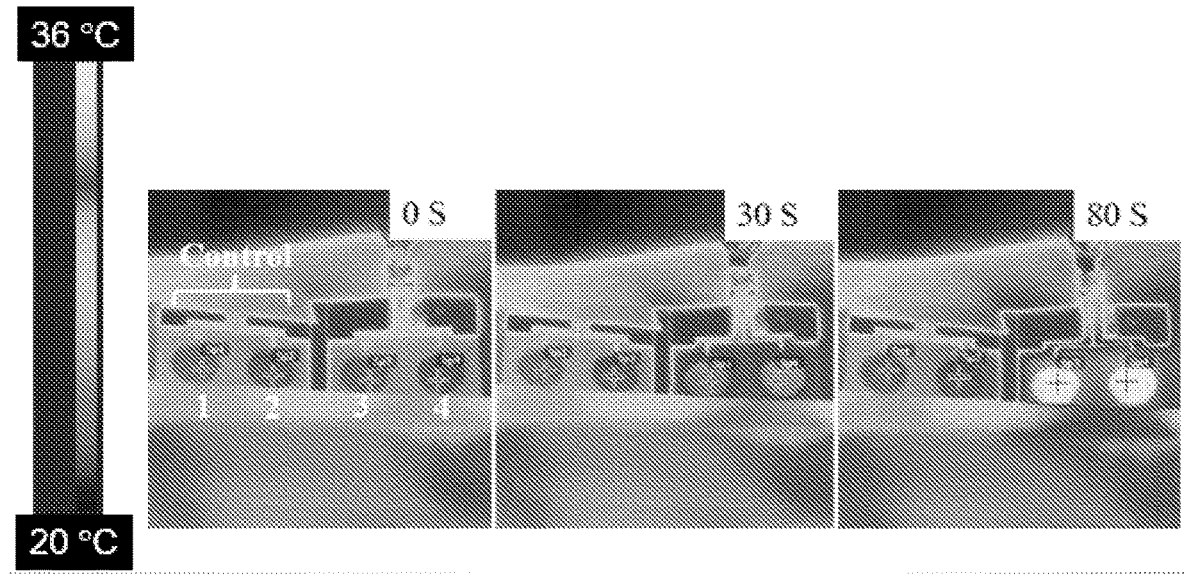
FIG. 23 illustrates the camera thermal images, for the power of 2 W at 2.45 GHz on a lower arm, at right before (left), 30 seconds after (middle), and 80 seconds after (right) applying the microwave radiation. Radiation is applied in holes 3 and 4, while holes 1 and 2 are control (no radiation).
Figure 24:
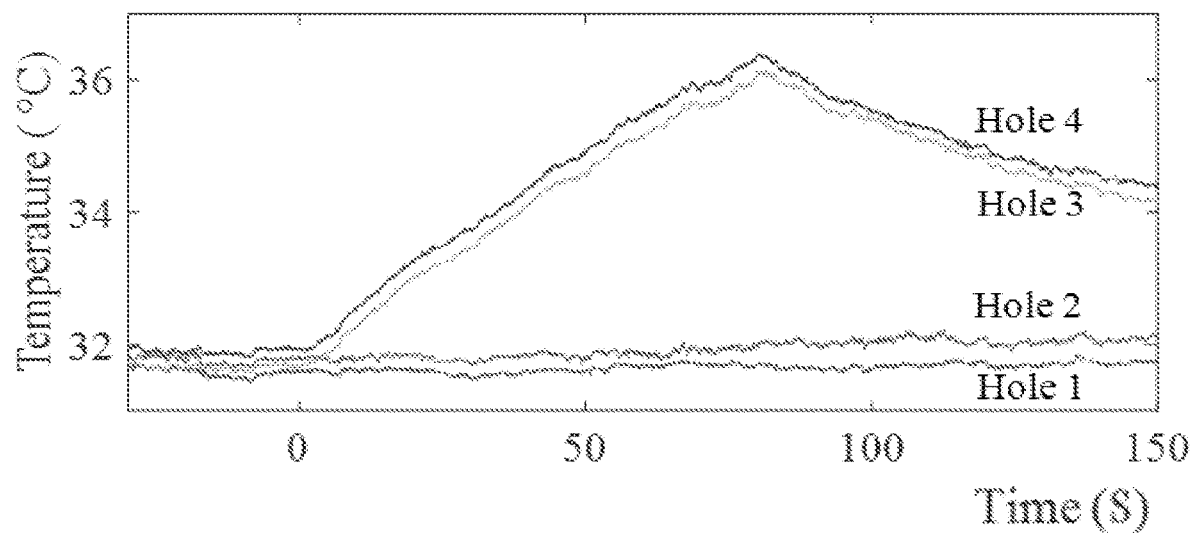
FIG. 24 is a graphical plot showing temperatures for the holes marked as 1, 2, 3, and 4. Radiation is applied in holes 3 and 4, while holes 1 and 2 are control (no radiation).

The experiment is repeated with the antenna arrays 144 placed on the lower arm. FIG. 23 illustrates the camera thermal images, for the power of 2 W at 2.45 GHz, at right before (left), 30 seconds after (middle), and 80 seconds after (right) applying the microwave radiation. Temperature for holes 106 marked as 1, 2, 3, and 4 are also recorded (see FIG. 24). A balanced power split is obtained that is due to the fact that the antenna in array 144 are laid air gap-free against the skin. The temperature of the control holes 1 and 2 do not rise during the experiment but it rises for heating holes 3 and 4, indicating local beams and heating zones under the heating antennas. The baseline temperatures for the holes range from 31.6° C. to 31.9° C., lowest for the control hole 1 and highest for heating hole 4. Nonetheless, the difference between temperature within each pairs (control or heating) is maintained during the heating and cooling period. The feed cable 118 is below the body temperature (see FIG. 23) and acts as a heat sink now, i.e., heat is conducted away from the body. Comparing FIGS. 22 and 24, a slightly more rapid temperature rise is evident for the arm study than the phantom study. This is due to the higher conductivity of the tissue (~1.8 S/m) compared to the water soaked sponge (measured to be ~0.7 S/m) at 2.45 GHz that was used for conducting this experiment. Saline soaked sponge, with complex permittivity very close to that for muscle, would be a better choice.

With the 2×1 array of annular slot antennas with 10-mm diameter holes at the center of the elements, the microstrip feed network provides broadband matching above 2.2 GHz. The antenna arrays 144 were tested on the soaked sponge tissue phantom and lower arm. A rather symmetric power split and heating trend between the two antenna arrays 144 is observed for the arm experiment. For a temperature rise of about 2° C., desirable for thermal diffusion method (used in an invasive thermal probe that uses a heating element rather than microwave radiation), power of about 1 W or less per antenna array 144 can be suggested. This power does not seem to create SAR risk, as the time averaged SAR would be comparable to the established limit for radio frequency (RF) heating for diagnostic equipment such as magnetic resonance imaging (MRI).

Example III

Exemplary Pulse Width Modulation Closed-Loop System

Figure 26:
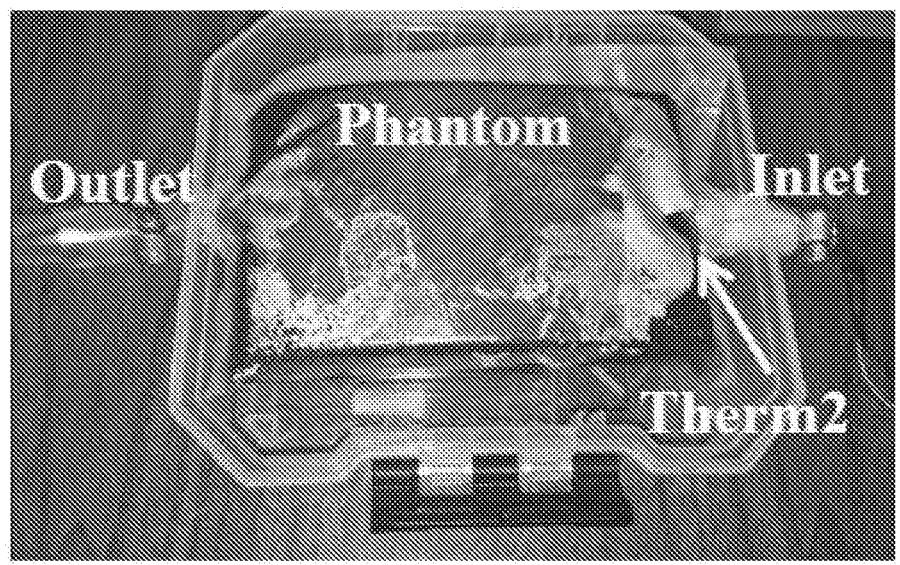
FIG. 26 illustrates a perfused phantom for perfusion experiment.
Figure 27:
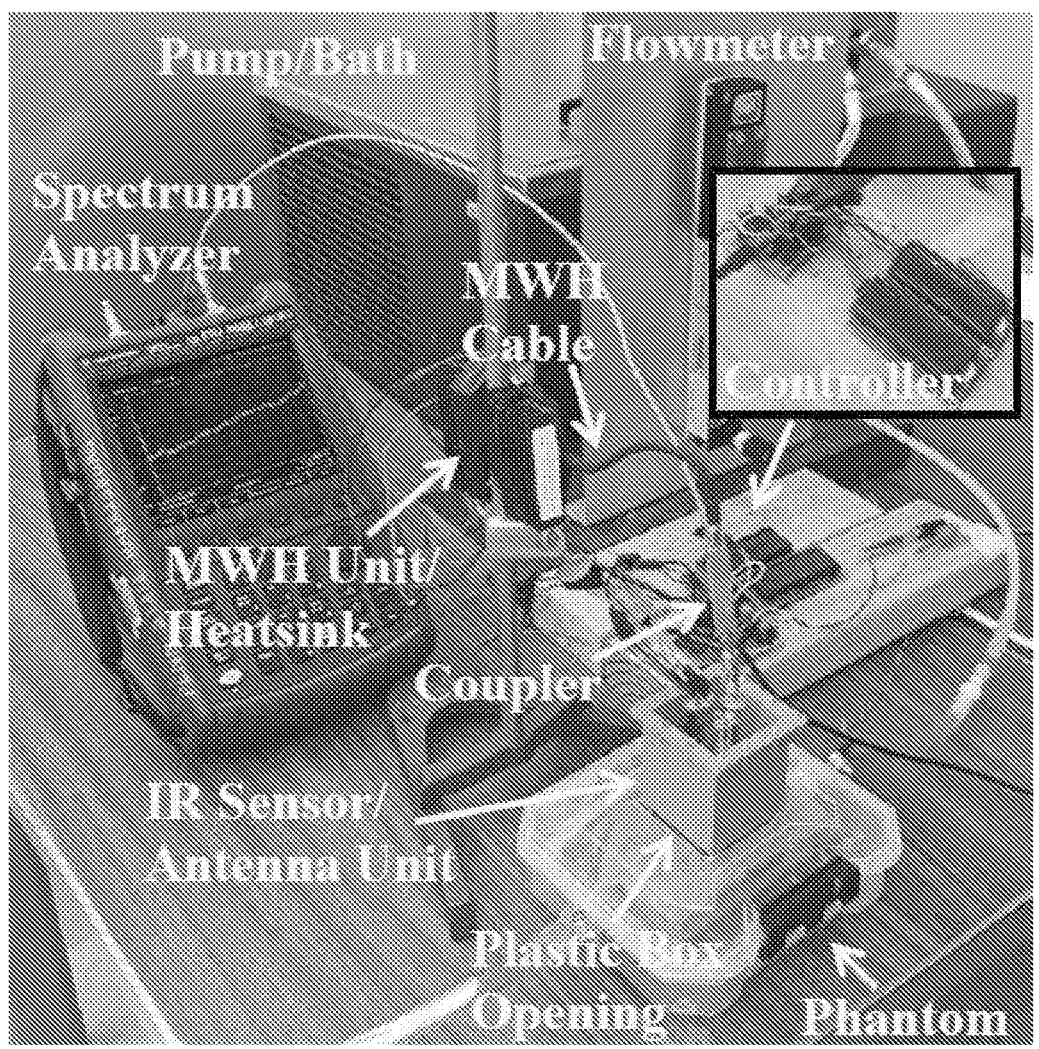
FIG. 27 illustrates the photo of the system with flow circulation setup for perfused phantom test.
Figure 28A:
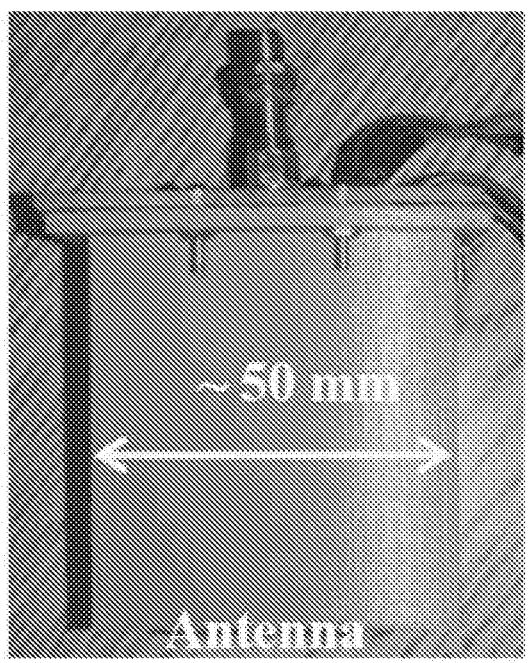
FIGS. 28A-B are the side view of the infrared sensor, feed coaxial cable, and heating element housing and its top view showing the heating element, coaxial cable, antenna, and infrared sensor.
Figure 28B:
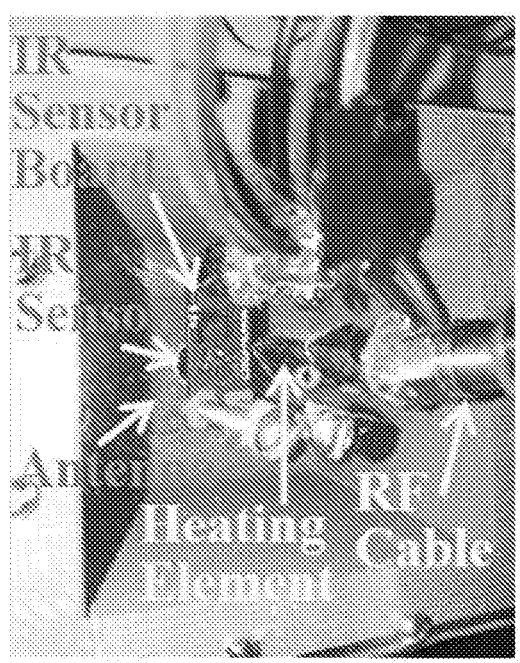

An embodiment of the antenna configuration of FIGS. 2 and 8 and system 100 configuration of FIGS. 3B, 7, utilizing pulse width modulation control of temperature, was constructed and tested. The antenna 102 was constructed and used to perform single-point measurement of response of variable flow rate and thus perfusion in a perfused phantom (see FIG. 26). The perfused phantom was placed as part of the measurement setup depicted in FIGS. 13B and 27. The perfused phantom is a rectangular block of sponge (140 mm×90 mm×19 mm) is tightly wrapped around by a 4-mil-thick plastic wrap (FIG. 26). The flow is created by a temperature regulated pump/bath (Endocal RTE-8DD, Neslab Instruments, Inc., Portsmouth, NH), is controlled by a flowmeter (FL-3803G, OMEGA Engineering, INC., Stamford, CT), and then enters and exits the sponge through tubing adapters (inlet and outlet). To seal the phantom, the plastic wrap is sealed at edges by a heat bag sealer, and the adapters are sealed by clamps (FIG. 26). Baseline temperature of the liquid entering the phantom is measured by a second thermistor (Therm2, see FIGS. 26 and 13B) placed inside the inlet. The thermal responses at the holes 106 were simultaneously measured using an infrared sensor 134 (see FIGS. 7 and 13B). The recorded temperature for the hole 106 is processed by a supporting data processing platform. For purposes of the study, and in reference to FIGS. 2A-B, the diameter of the slot 130 is selected to be D=22 mm, exhibiting a broad $S_{11}$ resonance around 2 GHz. The substrate material is FR4 with height 1.52 mm and a nominal dielectric constant value of 4.4. The superstrate is a 2.4-mm-thick commercial grade silicone rubber coating (GE Silicone II) with the dielectric constant and loss tangent of 3.12 and 0.01 respectively. A hole 106 with diameter B of about 8 mm is formed into the antenna 102. To secure the coaxial line to the antenna 102, a square shape landing flange of G=10 mm is used. In addition, $W_r$=1 mm, h=1.52 mm, d=2.4 mm, and G=10 mm. The coaxial feed 118 is applied from the top of the substrate 116, which is partly metalized (G×G). The metallization layer 126 is partially removed to generate an area with diameter C. The antennas is attached to the bottom of a housing that creates a temperature stable environment for the antenna 102 and the cable 118 feeding it. The heating element (with thermistor) 150 regulates the temperature of the cable. The heating element is incorporated to minimize the conductive heat transfer between the unit and a subject/patient at physiological temperature (skin temperature ~35° C.). This is achieved by increasing the cable temperature (from the room temperature ~20° C.) to reduce the temperature difference between the inside the unit/cable and the subject/patient skin temperature at the start of the measurement. Microwave heating of the tissue/phantom is regulated by pulse width modulator 149. The sensor housing is shown in FIG. 28.

Figure 13B:
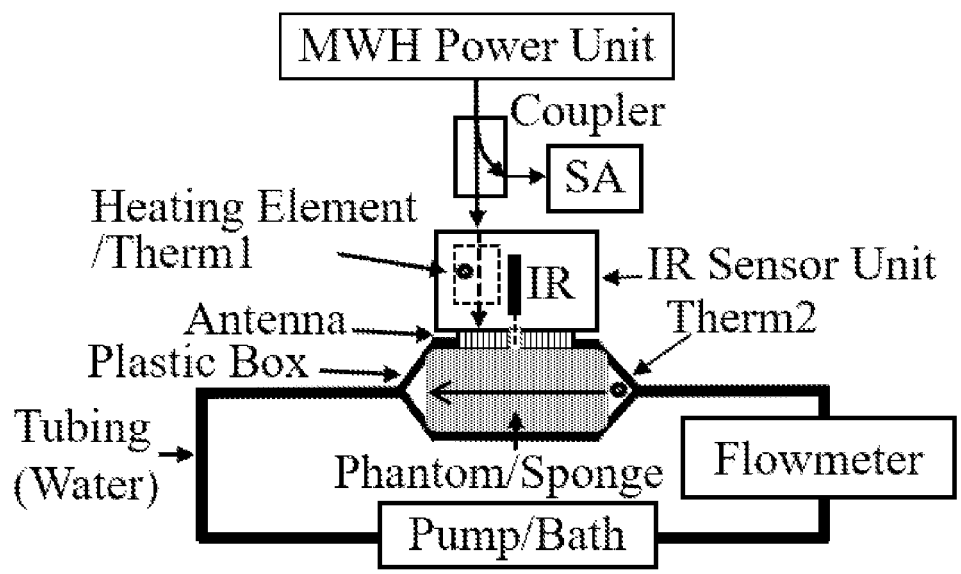

Pulse width modulation (PWM) is incorporated in controller software and turns on and off the driver amplifier 140 through a transistor switch IRFZ44N (see FIG. 25). FIGS. 29 A and B show photos of the controller circuitry and microwave power source/power amplifier respectively. The maximum RF power for 100% PWM is 2.1 W. A proportional feedback control (P controller) is implemented by the controller software. The PWM duty cycle is updated according to $PWM_n = K'_p(T_{set} - T_{read})$, where $PWM_n$ is an integer number between 0 to 255, corresponding to 256 possible duty cycle (0.39% resolution). $T_{set}$ and $T_{read}$ are set (target) temperature of phantom and read temperature by the infrared sensor respectively. Thus, $K'_p$ is a user input parameter describing duty cycle per ° C. For microwave heating (MWH), $K_p$ (W/° C.), the actual system's proportional feedback control parameter, in turn is $K_p = 2.1(PWM_n/255)$, given a 100% duty cycle MWH power of 2.1 W. FIGS. 13B and 27 show the schematic and photo of the test setup.

To minimize the effect of the thermal interaction between the circulation system and the surrounding environment, the microwave heating experiment is performed on the phantom maintained at the room temperature of 21.5° C. for this proof of concept study. This is done by regulating the temperature of the liquid (read by Therm2) circulating through the phantom by the temperature regulated pump/bath prior to the start of the experiment. Note that as the tubing system in its current implementation is not thermally insulated, surrounding air temperature fluctuations may slightly impact the liquid temperature in the order of a fraction of ° C. (~±35 0.1° C.) that is very small compared to the MWH heating.

The experiment is started by first running the Arduino program and then turning on the IR sensor housing unit's heating element. As previously mentioned, the main purpose of the heating element 150 is to set the temperature of the RF coaxial cable, which is in direct contact with the antenna, to a fix temperature prior to applying the microwave heating. The heating element 150 heating is also regulated using a PWM signal by the controller that is distinct from the pulse width modulator 149 for controlling the microwave heating power to the antenna 102. Since the heating element surrounds the RF cable and thermistor Therm1, the temperature read by the thermistor closely represents that of the cable. The set temperatures are selected as $T_{set}=25°$ C. for both the heating element and phantom target temperature read by the infrared sensor, which represents a targeted phantom temperature the same as the cable temperature, both 3.5° C. above the room temperature. This choice of the targeted MWH phantom temperature rise was primarily made to not exceed the temperature rise of 5° C. or more, common for microwave hyperthermia. Also, as the phantom is initially at room temperature, the temperature difference between the IR sensor unit/cable and the phantom may not be as significant in this study as compared to physiological measurement (~35° C. skin temperature). However, to test the heating element and for consistency of cable temperature between measurements, at the start of the experiment and prior to turning on the MWH, the cable temperature was also raised to 25° C.

Microwave heating by PWM is turned on after the temperature read by Therm1 reaches its steady-state value very close to 25° C. Microwave heating power is monitored by a 20-dB coupler (PE2210-20, Pasternack, Irvine, CA) and a spectrum analyzer (SA, Fieldfox N9918A, Keysight Technologies, Santa Rosa, CA) that functions in place of the power detector 142. The temperatures of the phantom (infrared) and cable (Therm1 thermistor) are read, and PWM signals are updated repeatedly in a loop by the controller. One measurement iteration takes about 1.7 s, including the wait times and the execution time for the controller code.

Figure 30A:
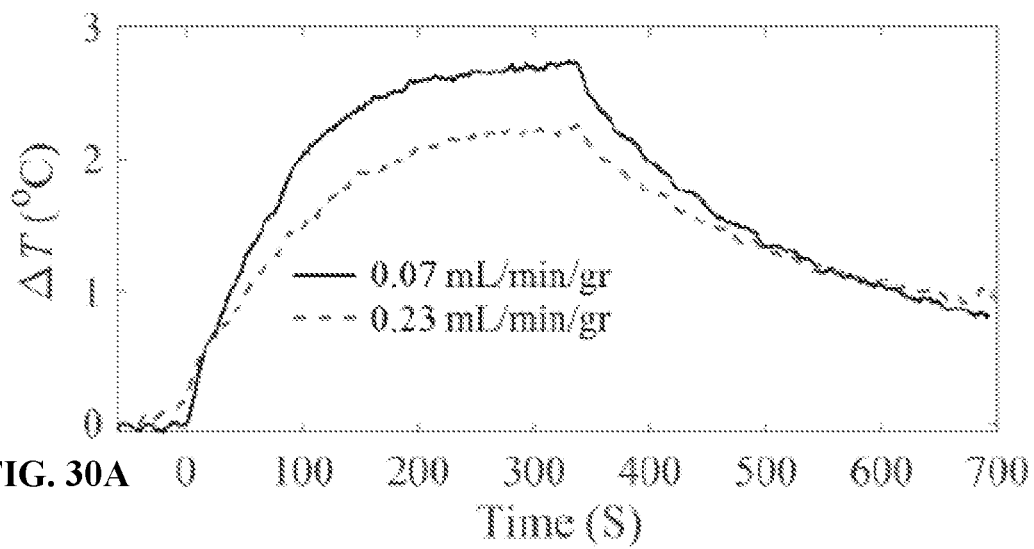
FIGS. 30A-B are graphical plots of phantom temperature rise from the 21.5° C. baseline (ΔT), due to the microwave heating and measured by the infrared sensor, and the corresponding average PWM voltage.
Figure 30B:
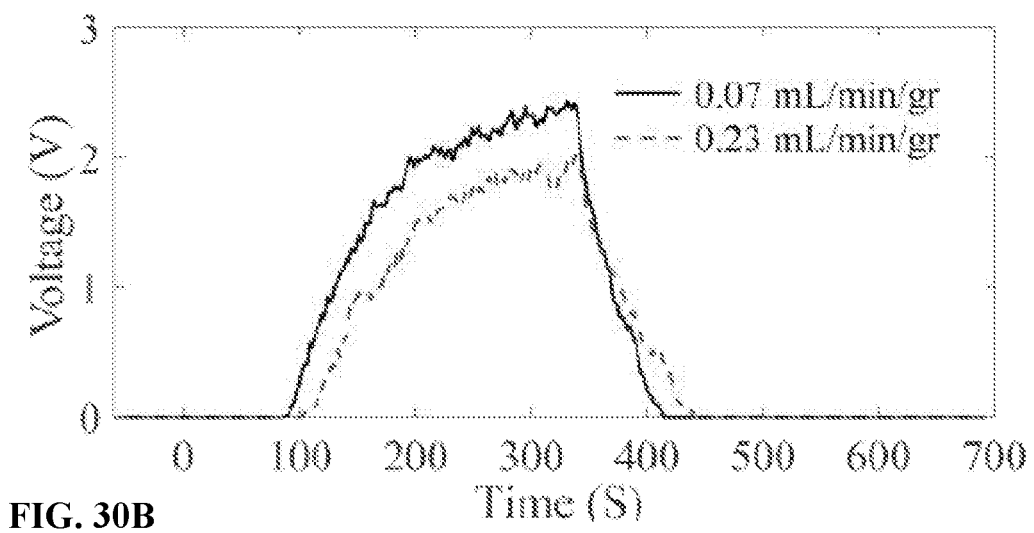

Results of microwave heating experiments performed on the perfused phantom are shown in FIG. 30 for $K_p=0.88$ W/° C., where temperature rise of the phantom due to the microwave heating (measured by the infrared sensor) from the baseline ($\Delta T=T_{read}-21.5°$ C.) and the corresponding average PWM pulsating voltage to the driver amplifier are shown. The perfusion is estimated by dividing the flow by the soaked sponge's weight (~240 gr). The two sets of graphs in FIG. 30 correspond to the low value of 0.07 mL/min/gr and the high value of 0.23 mL/min/gr, which reflect realistic normal skin perfusion range of ~0.1-0.2 mL/min/gr. Preheating by the heating element prior to the microwave heating (<0 s, FIG. 30A) increases the cable temperature to 25° C. However, the low thermal conductivity of the antenna FR4 and silicone layers effectively prevents the heat conduction between the infrared sensor/cable housing and the phantom and does not result in any noticeable phantom temperature rise attributed to the heating element (IR sensor reading, <0 s, FIG. 30A).

The graphs in FIG. 30 show that after about 3 minutes of applying the MWH a higher temperature rise of 2.5° C. for 0.07 mL/min/gr compared to 2° C. for 0.23 mL/min/gr is reached. In addition, to maintain these temperature rises, the average PWM voltage stays about 0.4-0.5 V lower for the high perfusion case compared to the low perfusion one as expected. Note that the MWH switching operates such that a 5 V PWM level from Arduino shuts off the power and a 0 V level turns it on. Thus, a lower average PWM voltage corresponds to a higher average MWH power.

The results show the ability of this novel system to clearly differentiate between perfusion values corresponding to the realistic range for skin. For practical use, the thermoregulatory response of the tissue can be quantified by either transient or steady-state value of both temperature and the average PWM voltage/power response. This provides a great degree of flexibility for assessing flow/perfusion using combined microwave heating and infrared radiometry.

Finally, the current system uses off-the-shelf RF components, connected together in a modular fashion (FIG. 29B), which limits its efficiency, limited mainly by the PA. The efficiency of the MWH unit can be improved by the integration of RF components and benefiting from advances in PA technology, e. g. GaN based PA offering 60-70% efficiency. This would also allow placement and packaging of the system components in system 100 in a more compact form as it reduces challenges related to temperature control and heatsinking requirements when these components are placed closer together as one portable system.

It should be understood that the disclosure of a range of values is a disclosure of every numerical value within that range, including the end points. It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be apparent to those skilled in the art that numerous modifications and variations of the described examples and embodiments are possible considering the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof.

It should be understood that modifications to the embodiments disclosed herein can be made to meet a particular set of design criteria. Therefore, while certain exemplary embodiments of the system and methods of using and making the same disclosed herein have been discussed and illustrated, it is to be distinctly understood that the invention is not limited thereto but may be otherwise variously embodied and practiced within the scope of the following claims.

What is claimed is:

1. A blood perfusion assessment system, comprising:
   a microwave source configured to interact with tissue via generation of microwave radiation;
   an antenna configured to direct the microwave radiation by emitting a microwave beam so that the microwave beam is incident upon the tissue and creates a heating zone directly in the tissue, the antenna including:
   a substrate having a substrate top surface and a substrate bottom surface;

a metallization layer formed on the substrate top surface and substrate bottom surface; and a hole formed in the substrate extending from the substrate top surface to the substrate bottom surface;

a de-metallized area formed around the hole at the substrate bottom surface, wherein the de-metallized area circumscribes the hole at the substrate bottom surface; and a slot enveloping the de-metallized area; and a radiometer configured to receive infrared radiation emitted from the tissue through the hole.

2. The blood perfusion assessment system of claim 1, comprising:

a controller coupled to the microwave source and radiometer, wherein:

the controller converts the infrared radiation received by the radiometer to temperature readings; and the controller is configured to adjust the microwave source based on the temperature readings.

3. The blood perfusion assessment system of claim 2, wherein adjustment of microwave source power is based on turning the microwave source on and off by the controller.

4. The blood perfusion assessment system of claim 1, wherein the radiometer comprises an infrared camera.

5. The blood perfusion assessment system of claim 1, wherein the radiometer comprises an infrared thermometer.

6. The blood perfusion assessment system of claim 1, further comprising:

a superstrate disposed on the substrate bottom surface.

7. The blood perfusion assessment system of claim 6, wherein the superstrate covers the metallization layer and the de-metallized area.

8. The blood perfusion assessment system of claim 1 comprising a superstrate disposed on the substrate bottom surface, wherein the hole extends through the superstrate.

9. The blood perfusion assessment system of claim 1, wherein the microwave source and controller are embedded in the substrate.

10. The blood perfusion assessment system of claim 1, wherein the radiometer comprises an infrared thermometer and the infrared thermometer is located within the hole.

11. The blood perfusion assessment system of claim 1, wherein the radiometer comprises an infrared thermometer and the infrared thermometer is located above the hole.

12. The blood perfusion assessment system of claim 1, wherein:

the hole comprises a plurality of individual holes arranged in an array;

the de-metallized area comprises a plurality of individual de-metallized areas at the substrate bottom surface, each individual de-metallized area formed around each individual hole at the substrate bottom surface, wherein each individual de-metallized area circumscribes each individual hole at the substrate bottom surface; and the slot comprises a plurality of individual slots, each individual slot enveloping each individual de-metallized area.

13. The blood perfusion assessment system of claim 12, wherein:

the microwave source comprises a plurality of microwave sources arranged in an array.

14. The blood perfusion assessment system of claim 12, further comprising:

a microstrip feed network formed in the metallization layer, the microstrip feed network connected to at least two individual slots and configured to provide a power splitting function.

15. The blood perfusion assessment system of claim 14, wherein:

the microwave source is embedded in the substrate.

* * * * *